US012613522B2

(12) United States Patent
Fukamachi et al.

(10) Patent No.: US 12,613,522 B2
(45) Date of Patent: Apr. 28, 2026

(54) INFORMATION PROCESSING DEVICE, MOVABLE APPARATUS, INFORMATION PROCESSING METHOD, AND STORAGE MEDIUM

(71) Applicant: CANON KABUSHIKI KAISHA, Tokyo (JP)

(72) Inventors: Hitoshi Fukamachi, Kanagawa (JP); Akiteru Naka, Tokyo (JP); Masakazu Fujiki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 18/493,368

(22) Filed: Oct. 24, 2023

(65) Prior Publication Data

US 2024/0142982 A1 May 2, 2024

(30) Foreign Application Priority Data

Nov. 2, 2022 (JP) ................................. 2022-176088

(51) Int. Cl.
*G05D 1/00* (2024.01)
(52) U.S. Cl.
CPC .................................. *G05D 1/0223* (2013.01)
(58) Field of Classification Search
CPC ........ G05D 1/0223; G05D 1/243; G05D 1/65; G05D 1/6987; G05D 1/246; G05D 2105/28; G05D 2107/70; G05D 2109/10; G05D 2111/10; G06Q 10/08
See application file for complete search history.

(56) References Cited

U.S. PATENT DOCUMENTS

| | | | | |
|---|---|---|---|---|
| 9,927,816 B2 * | 3/2018 | Li | .......................... | G05D 1/0295 |
| 10,645,322 B2 * | 5/2020 | Sekine | ................. | H04N 25/771 |
| 11,185,977 B2 * | 11/2021 | Kobayashi | ........... | B25J 15/0683 |
| 12,298,140 B2 * | 5/2025 | Nakata | ............... | G01C 21/3889 |
| 2016/0275797 A1 * | 9/2016 | Lefevre | .................. | G08G 1/166 |

(Continued)

FOREIGN PATENT DOCUMENTS

| | | | |
|---|---|---|---|
| JP | 2015203577 A | * | 11/2015 |
| JP | 2020160904 A | * | 10/2020 |

OTHER PUBLICATIONS

U.S. Appl. No. 18/377,322, filed Oct. 6, 2023 by Yoshihiro Naganawa.

(Continued)

*Primary Examiner* — Rachid Bendidi
*Assistant Examiner* — Nada Mahyoob Alqaderi
(74) *Attorney, Agent, or Firm* — VENABLE LLP

(57) ABSTRACT

An information processing device capable of improving moving efficiency of a movable apparatus is characterized by: acquiring information regarding surroundings of a movable apparatus; performing measurement in regard to position and orientation information of the movable apparatus and a reliability of the position and orientation information; analyzing motion of a different movable apparatus in the surroundings from the information regarding the surroundings of the movable apparatus; and determining whether or not the movable apparatus is to follow the different movable apparatus on the basis of the reliability of the position and orientation information of the movable apparatus and a result of the analysis.

14 Claims, 15 Drawing Sheets

(56)     References Cited

U.S. PATENT DOCUMENTS

| | | | | |
|---|---|---|---|---|
| 2017/0103655 | A1* | 4/2017 | Ishikawa | G08G 1/163 |
| 2018/0272539 | A1* | 9/2018 | Kitamura | B25J 9/1687 |
| 2019/0096069 | A1* | 3/2019 | Qian | G06T 7/248 |
| 2019/0180077 | A1* | 6/2019 | Zhou | G06V 20/52 |
| 2019/0392091 | A1* | 12/2019 | Kliemann | G06F 30/20 |
| 2020/0333789 | A1* | 10/2020 | Suzuki | G05D 1/0212 |
| 2022/0147057 | A1* | 5/2022 | Kwak | A47L 9/2805 |
| 2022/0288778 | A1* | 9/2022 | Østergaard | G05D 1/0246 |
| 2023/0023651 | A1* | 1/2023 | Fukamachi | G06T 7/70 |
| 2023/0030791 | A1 | 2/2023 | Miyatani | |
| 2023/0110992 | A1 | 4/2023 | Numakami | |
| 2023/0134912 | A1 | 5/2023 | Wanda | |
| 2023/0243667 | A1 | 8/2023 | Miyakawa | |
| 2023/0324199 | A1 | 10/2023 | Fukamachi | |
| 2023/0342956 | A1 | 10/2023 | Ohira | |
| 2024/0019877 | A1* | 1/2024 | Li | G05D 1/12 |
| 2024/0123974 | A1* | 4/2024 | Zhang | H04W 4/44 |
| 2024/0184292 | A1* | 6/2024 | Ohira | B60W 30/165 |

OTHER PUBLICATIONS

U.S. Appl. No. 18/502,351, filed Nov. 6, 2023 by Shoko Miura.
U.S. Appl. No. 18/387,884, filed Nov. 8, 2023 by Yukio Numakami.
U.S. Appl. No. 18/522,615, filed Nov. 29, 2023 by Shinji Ohira.
"ORB-SLAM 2: an Open-Source SLAM System for Monocular, Stereo, and RGB-D Cameras", by Raúl Mur-Artal, Juan D. Tardós, IEEE Transactions on Robotics, pp. 1-8, published Jun. 19, 2017.

* cited by examiner

Figure 8:
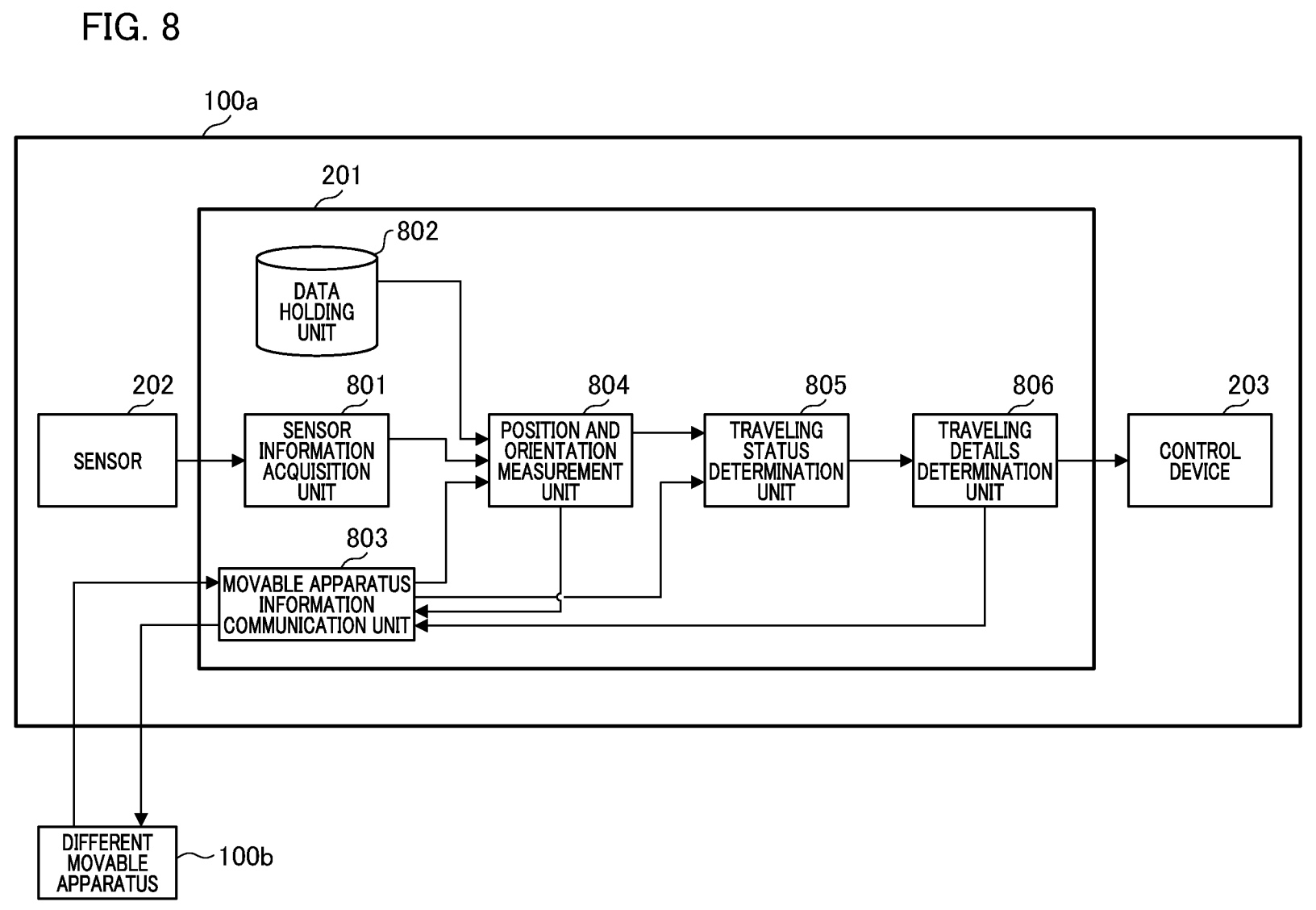

202 SENSOR

802 DATA HOLDING UNIT

801 SENSOR INFORMATION ACQUISITION UNIT

803 MOVABLE APPARATUS INFORMATION COMMUNICATION UNIT

804 POSITION AND ORIENTATION MEASUREMENT UNIT

805 TRAVELING STATUS DETERMINATION UNIT

806 TRAVELING DETAILS DETERMINATION UNIT

203 CONTROL DEVICE

100b DIFFERENT MOVABLE APPARATUS

INFORMATION PROCESSING DEVICE, MOVABLE APPARATUS, INFORMATION PROCESSING METHOD, AND STORAGE MEDIUM

BACKGROUND OF THE INVENTION

Field of the Invention

The present invention relates to an information processing device, a movable apparatus, an information processing method, and a storage medium.

Description of the Related Art

Movable apparatuses such as automated guided vehicles (AGVs) and autonomous mobile robots (AMRs) are used to transport loads such as products and parts to predetermined positions in plants, shipping storages, and the like.

R. Mur-Artal, et al., "ORB-SLAM2: an Open-Source SLAM System for Monocular, Stereo, and RGB-D Cameras", 2017. describes a method for calculating a position and orientation by performing measurement in the surroundings with a camera or a light detection and ranging (LiDAR) and comparing the measurement results with map data.

Also, autonomous traveling toward a predetermined destination is performed by calculating the position and orientation. A plurality of such movable apparatuses is used on site, and an improvement in moving efficiency of an entire system is required.

However, in a case where accuracy of position and orientation measurement is degraded in movement control of the movable apparatuses, moving efficiency may be degraded due to reduction of moving speeds.

SUMMARY OF THE INVENTION

An information processing device according to an aspect of the present invention includes at least one processor or circuit configured to function as: a sensor information acquisition unit configured to acquire information regarding surroundings of a movable apparatus; a position and orientation information measurement unit configured to perform measurement regarding position and orientation information of the movable apparatus and a reliability of the position and orientation information; a movable apparatus analysis unit configured to analyze motion of a different movable apparatus in the surroundings from the information regarding the surroundings of the movable apparatus acquired by the sensor information acquisition unit; and a determination unit configured to determine whether or not the movable apparatus is to follow the different movable apparatus on the basis of the reliability of the position and orientation information of the movable apparatus and a result of the analysis of the movable apparatus analysis unit.

Further features of the present invention will become apparent from the following description of embodiments with reference to the attached drawings.

BRIEF DESCRIPTION OF THE DRAWINGS

FIG. 8 is a functional block diagram illustrating a functional configuration of an information processing device 201 according to a second embodiment.

DESCRIPTION OF THE EMBODIMENTS

Figure 1:
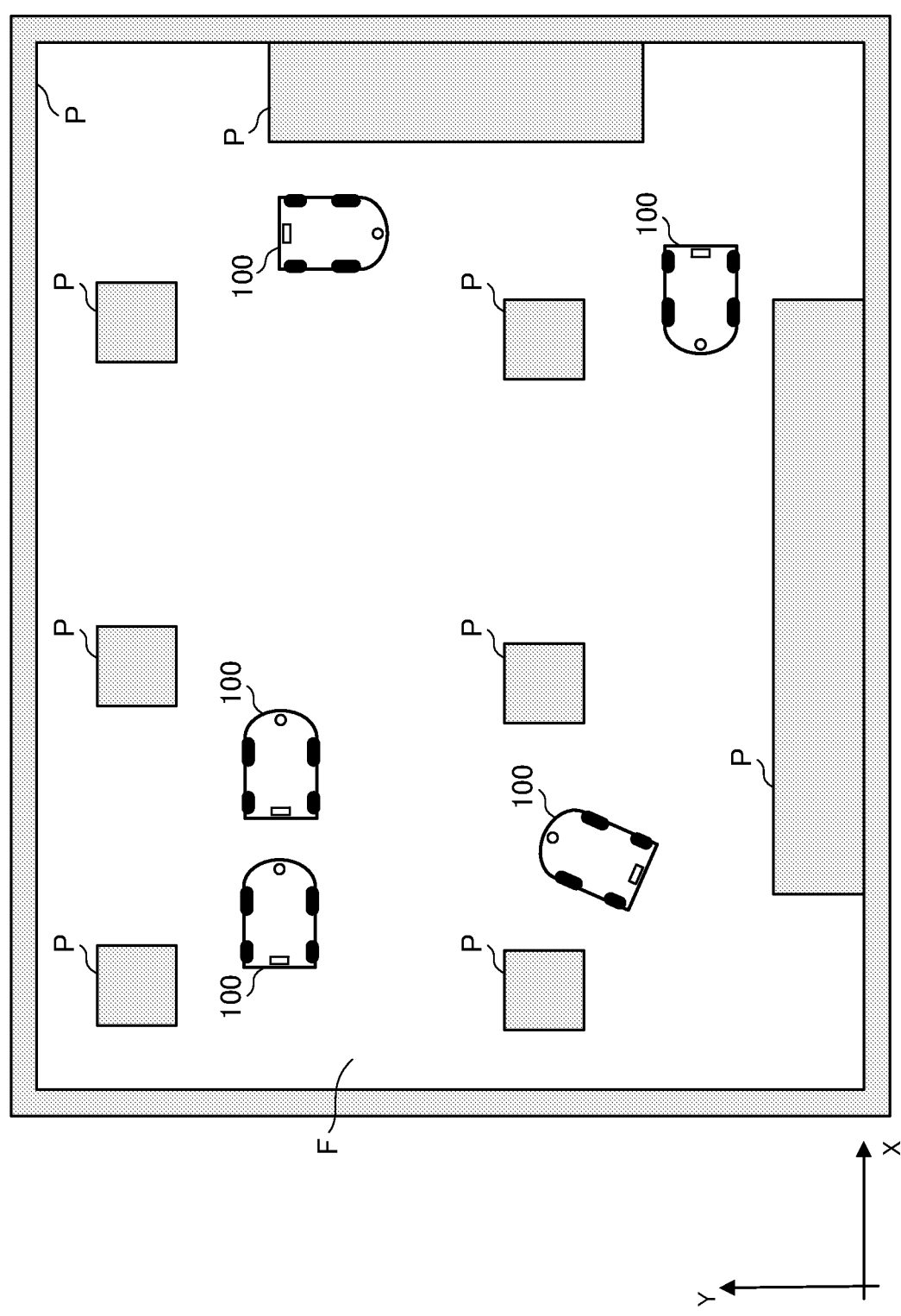
FIG. 1 is a schematic view illustrating a system overall configuration according to a first embodiment.

Hereinafter, with reference to the accompanying drawings, favorable modes of the present invention will be described using Embodiments. In each diagram, the same reference signs are applied to the same members or elements, and duplicate description will be omitted or simplified.

First Embodiment

In a first embodiment, an example in which a movable apparatus as a subject itself (hereinafter, also referred to as a host movable apparatus) operates to follow a different movable apparatus (hereinafter, referred to as a different movable apparatus) in the surroundings in a case where the reliability of position and orientation information of the host movable apparatus is degraded will be described. Specifically, a situation in which a different movable apparatus is present on the side in front when the host movable apparatus is autonomously traveling to a destination is assumed, and an example in which a method of the present embodiment is applied to the situation will be described.

Note that an example in which an autonomous movable apparatus such as an automated guided vehicle (AGV) or an autonomous mobile robot is used as a movable apparatus will be described in the first embodiment.

The movable apparatus measures a position and orientation of the host movable apparatus and a reliability of the position and orientation and analyzes motion of a different movable apparatus that is present in the surroundings of the movable apparatus. A traveling status regarding whether or not to follow the different movable apparatus and whether following is possible is determined from the reliability of the host movable apparatus and a result of analyzing the motion of the different movable apparatus. As the determination of the traveling status, the host movable apparatus performs autonomous traveling in a case where the reliability of the host movable apparatus is high.

Also, in a case where the reliability of the host movable apparatus is low, determination regarding following traveling is performed on the basis of whether or not a different movable apparatus in the same moving direction as that of the host movable apparatus is present from the result of analyzing the motion of the different movable apparatus. In a case where the reliability of the host movable apparatus is low and a different movable apparatus in the same moving direction as that of the host movable apparatus is present, the host movable apparatus determines to follow and travel with the different movable apparatus. In a case where the reliability of the host movable apparatus is low and a different movable apparatus in the same moving direction is not present, the host movable apparatus determines to travel autonomously.

The traveling details such as a moving direction and a moving speed of the host movable apparatus are determined on the basis of the result of determining the traveling status. In a case of autonomous traveling, the moving direction is determined in accordance with route information, and as for the moving speed, a predefined moving speed is determined on the basis of the reliability of the host movable apparatus. In a case of following traveling, these are determined on the basis of a moving direction and a moving speed of the different movable apparatus as a target of following.

It is possible to stably perform autonomous traveling in a case where the reliability of the host movable apparatus is high, and it is possible to reduce reduction of a moving speed of the host movable apparatus and to improve moving efficiency of the host movable apparatus by following and traveling with the different movable apparatus in a case where the reliability of the host movable apparatus is low.

Note that in the first embodiment, the autonomous traveling is defined as a traveling method in which traveling details are determined on the basis of route information and a reliability of the host movable apparatus while the following traveling is defined as a traveling method in which the movable apparatus determines traveling details on the basis of the moving direction and the moving speed of the different movable apparatus as a target of following. Also, the reliability is assumed to be a value for evaluating accuracy of the position and orientation. Moreover, the host movable apparatus is assumed to move on a two-dimensional plane.

FIG. 1 is a schematic view illustrating a system overall configuration according to the first embodiment. In FIG. 1, F illustrates a floor surface as a two-dimensional plane on which a plurality of movable apparatuses 100 move, and P illustrates a wall and a pole. Also, an X axis and a Y axis are defined as in the drawing as coordinate axes with respect to the floor surface F.

Different destinations are set for the plurality of movable apparatuses 100, and the movable apparatuses 100 transport loads to the different destinations. In the following description, a method for improving moving efficiency of the movable apparatuses 100 by moving to their destinations as fast as possible in such a situation will be described.

Figure 2:
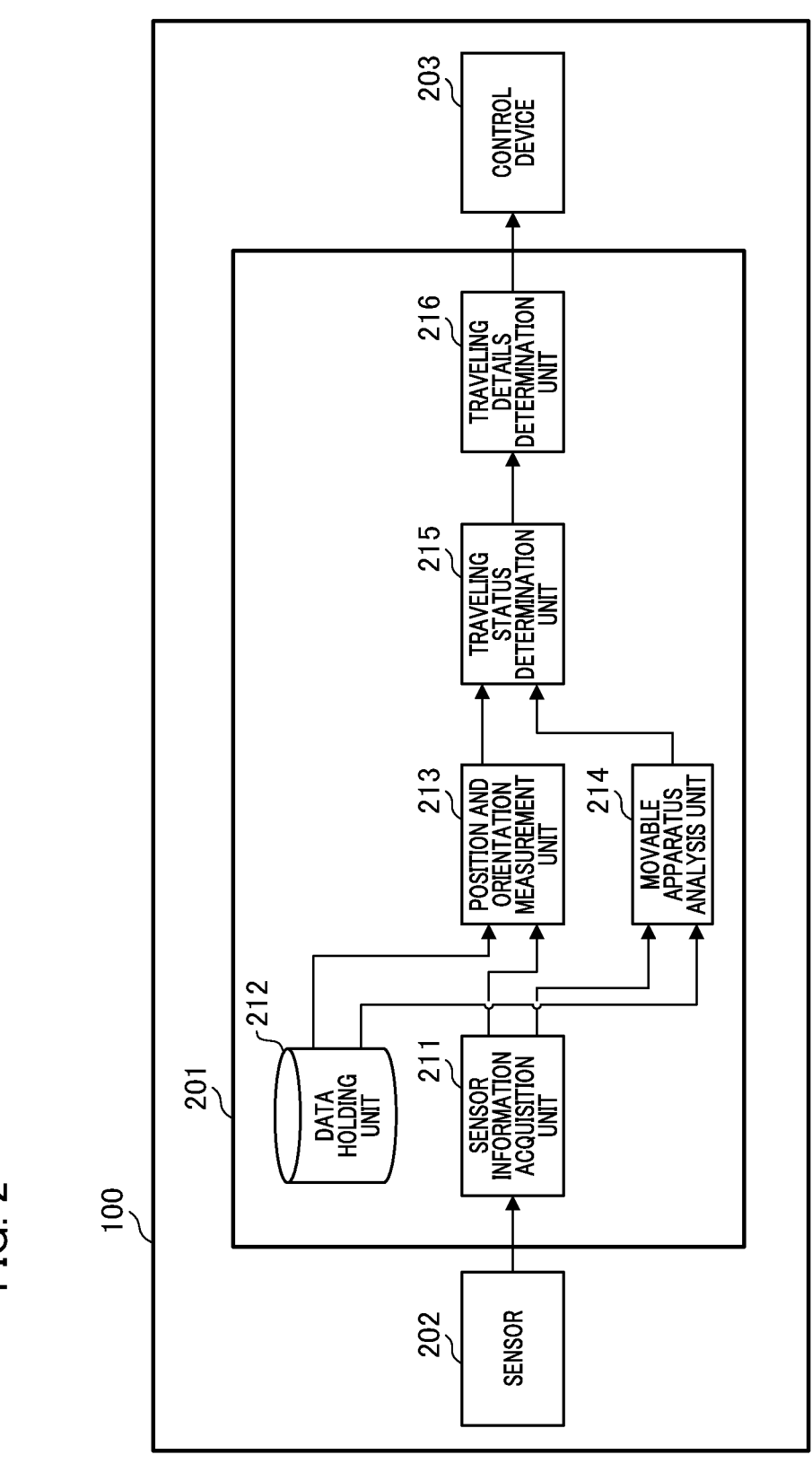
FIG. 2 is a functional block diagram illustrating a functional configuration of a movable apparatus 100 according to the first embodiment.

FIG. 2 is a functional block diagram illustrating a functional configuration of each movable apparatus 100 according to the first embodiment. Note that some of the functional blocks illustrated in FIG. 2 are implemented by causing a CPU as a computer included in an information processing device 201, the movable apparatus, or the like to execute a computer program stored in a memory as a storage medium.

However, some or all of them may be implemented by hardware. As the hardware, it is possible to use a dedicated circuit (ASIC), a processor (a reconfigurable processor, a DSP), or the like.

Also, the functional blocks illustrated in FIG. 2 may not be incorporated in the same casing and may be configured by separate devices connected to each other via signal lines. Note that the above description in relation to FIG. 2 similarly applies to FIGS. 8 and 14.

The movable apparatus 100 is configured of an information processing device 201, a sensor 202, a control device 203, and the like. In the following description, a movable apparatus as a host movable apparatus that is a target of control of the information processing device 201 will be denoted by 100a, and the other movable apparatuses will be denoted by 100b and 100c.

The sensor 202 performs measurement in regard to surroundings information of the movable apparatus 100a. The sensor information obtained through the measurement is transmitted to the information processing device 201. Note that the sensor 202 is a stereo camera, and the sensor information is captured image data in the first embodiment.

The information processing device 201 is configured of a sensor information acquisition unit 211, a data holding unit 212, a position and orientation measurement unit 213, a movable apparatus analysis unit 214, a traveling status determination unit 215, a traveling details determination unit 216, and the like. The sensor information acquisition unit 211 acquires information regarding the surroundings of the movable apparatus by receiving and acquiring the sensor information measured by the sensor 202. The acquired sensor information is output to the position and orientation measurement unit 213 and the movable apparatus analysis unit 214.

The data holding unit 212 holds map data created in advance. The map data is used to measure the position and orientation of the movable apparatus 100a by the position and orientation measurement unit 213. Also, the data holding unit 212 holds object model data used by the movable apparatus analysis unit 214. The object model data is used to detect a different movable apparatus 100b and the like that are present in the surroundings of the movable apparatus 100a by the movable apparatus analysis unit 214.

The position and orientation measurement unit 213 calculates the position and orientation and the reliability of the movable apparatus 100a on the basis of captured image data acquired by the sensor information acquisition unit 211 and the map data in the data holding unit 212. In other words, the position and orientation measurement unit 213 performs measurement in regard to position and orientation information of the movable apparatus and a reliability of the position and orientation information.

The movable apparatus analysis unit 214 detects the different movable apparatus 100b that is present in the surroundings of the movable apparatus 100a on the basis of the captured image data acquired by the sensor information acquisition unit 211 and the object model data held by the data holding unit 212. Also, the movable apparatus analysis unit 214 analyzes motion of the detected different movable apparatus 100b. In other words, the movable apparatus analysis unit 214 analyzes motion of the different movable apparatus in the surroundings from the information regarding the surroundings of the movable apparatus acquired by the sensor information acquisition unit 211.

The traveling status determination unit 215 determines a traveling status regarding whether the movable apparatus 100a has to follow the different apparatus 100b and whether the movable apparatus 100a can follow the different apparatus 100b on the basis of the reliability of the movable apparatus 100a measured by the position and orientation measurement unit 213 and the motion of the different movable apparatus 100b analyzed by the movable apparatus analysis unit 214. In other words, the traveling status determination unit 215 determines whether or not the movable apparatus is to follow the different movable apparatus on the basis of the reliability of the position and orientation information of the movable apparatus and the analysis result of the movable apparatus unit.

The traveling details determination unit 216 determines the moving direction and the moving state as traveling details of the movable apparatus 100a on the basis of the result output by the traveling status determination unit 215. The determined moving direction and moving speed are output to the control device 203. In other words, the traveling details determination unit 216 determines at least one of the moving direction and the moving speed of the movable apparatus 100 on the basis of the determination result of the traveling status determination unit 215 and the analysis result of the movable apparatus analysis unit 214.

The control device 203 controls a direction of wheels of the movable apparatus and a rotation speed of a motor as a drive source in accordance with the moving direction and the moving speed of the movable apparatus 100a determined by the information processing device 201 and controls movement of the movable apparatus 100a. In other words, the control device 203 of the movable apparatus 100 performs control (such as direction control and speed control) of a drive device of the movable apparatus in accordance with the determination result of the traveling details determination unit 216.

Figure 3:
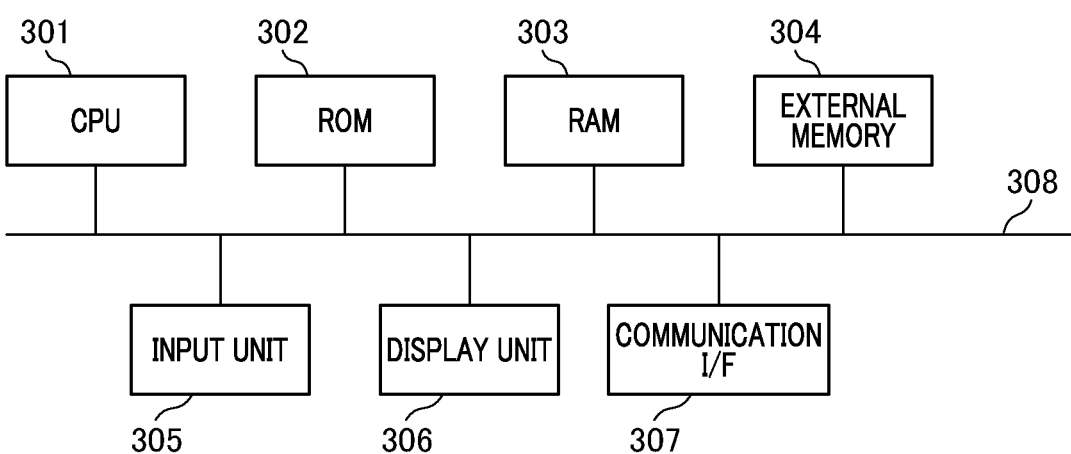
FIG. 3 is a block diagram illustrating a hardware configuration of an information processing device 201 according to the first embodiment.

FIG. 3 is a block diagram illustrating a hardware configuration of the information processing device 201 according to the first embodiment. A central processing unit (CPU) 301 as a computer reads computer programs stored in a ROM 302, a RAM 303, and an external memory 304, executes various kinds of processing, and controls various devices connected to a system bus 308.

The ROM 302 stores a BIOS program and a boot program. The RAM 303 is used as a main storage device of the CPU 301. The external memory 304 stores the computer programs processed by the information processing device 201. An input unit 305 is a keyboard, a mouse, a robot controller, or the like and performs input processing of information and the like from a user.

A display unit 306 generates a display signal for performing display on a display device such as a liquid crystal display or a projector and causes an arithmetic operation result of the information processing device 201 to be displayed on a display screen of the display device in response to an instruction from the CPU 301.

The communication interface unit 307 performs information communication with the sensor 202, the control device 203, and other connected peripheral devices. Note that although the display device is a display device of an external PC terminal, for example, connected via the communication interface unit 307, the display device may be mounted on the movable apparatus 100.

Figure 4:
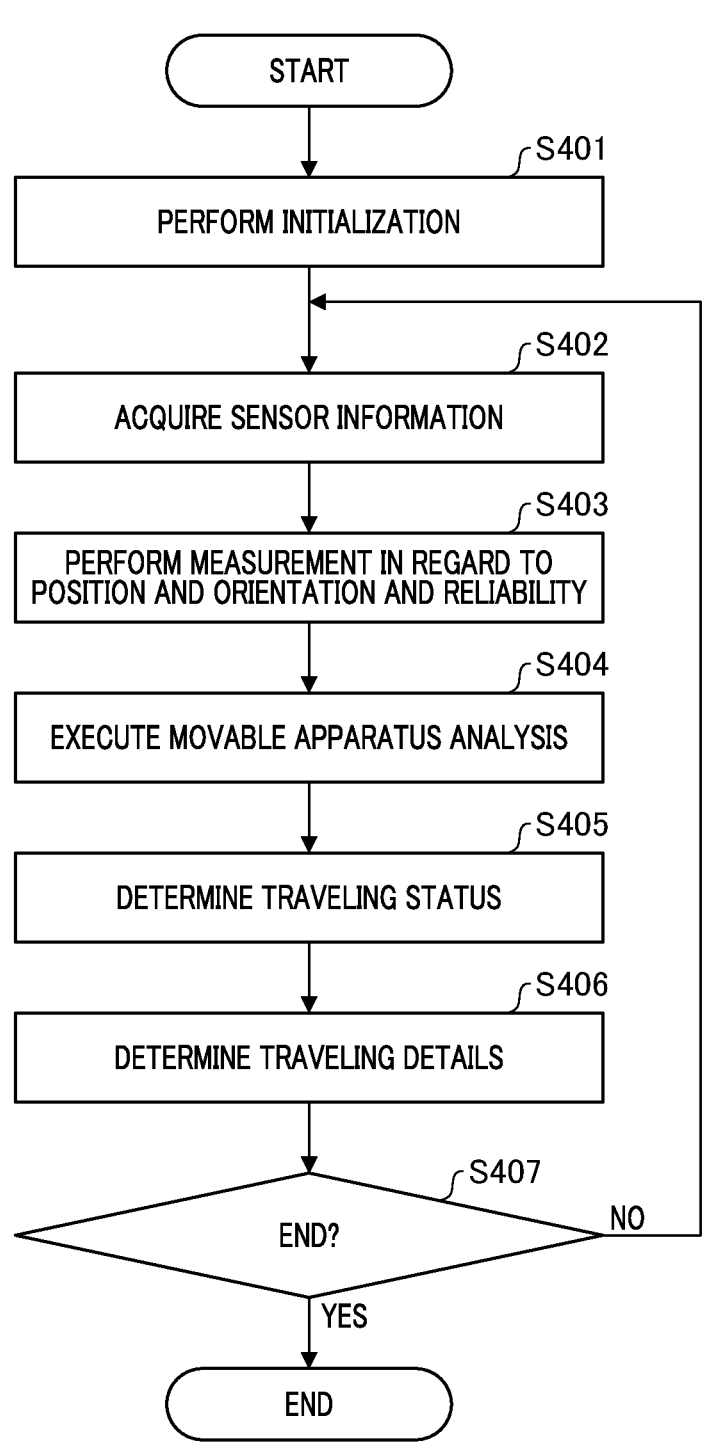
FIG. 4 is a flowchart illustrating a processing procedure of the information processing device 201 according to the first embodiment.

FIG. 4 is a flowchart illustrating a processing procedure of the information processing device 201 according to the first embodiment. Each piece of processing illustrated in the flowchart in FIG. 4 is realized by the CPU 301 as a computer executing a computer program stored in the memory.

In Step S401, system initialization is performed, the program is read from the external memory 304, and the information processing device 201 is brought into an operable state. Here, the map data held by the data holding unit 212 is read, and destination setting and route setting for the movable apparatus 100a are performed. The destination is a predetermined place to which the user desires to cause the movable apparatus 100a to move, and coordinates in a real space are expressed as two-dimensional coordinates such as (XWT, YWT).

In Step S402 (sensor information acquisition step), information regarding the surroundings of the movable apparatus is acquired by the sensor information acquisition unit 211 acquiring captured image data. The sensor information acquisition unit 211 receives the captured image data at the latest clock time obtained by imaging the surroundings of the movable apparatus 100a at a cycle of 60 frames/second, for example.

Here, a captured image data group within a range of a specific period of time (within a range of several seconds, for example) from the latest clock time of the reception by the sensor information acquisition unit 211 is held. A plurality of continuous captured image data groups are used to analyze motion of the different movable apparatus 100b in the following steps.

In Step S403 (position and orientation information measurement step), the position and orientation and the reliability of the movable apparatus 100a are measured on the basis of the map data read in Step S401 and the captured image data acquired in Step S402. In other words, the position and orientation information of the movable apparatus and the reliability of the position and orientation information are measured in Step S403.

Note that as a method for calculating the position and orientation of the movable apparatus 100a, for example, a simultaneous localization and mapping (SLAM) technology is used.

As for the reliability, feature points extracted from the captured image data at the latest clock time and feature points in the map data in the data holding unit 212 are compared, and the number of pairs of matching feature points is obtained. As the number of pairs of matching feature points increases, the reliability becomes a higher value. On the other hand, in a case where the number of pairs of matching feature points is small, the reliability becomes a small value, and the likelihood that the position and orientation has not been able to be accurately calculated is high.

In Step S404 (movable apparatus analysis step), the movable apparatus analysis unit 214 executes detection of the different movable apparatus 100b that is present in the surroundings of the movable apparatus 100a and analysis processing of motion thereof. In other words, the movable apparatus analysis unit 214 analyzes motion of the different movable apparatus in the surroundings from information regarding the surroundings of the movable apparatus acquired by the sensor information acquisition unit in Step S404.

The movable apparatus analysis unit 214 analyzes motion of the different movable apparatus 100b on the basis of at least one of the position, the moving direction, the moving speed of the different movable apparatus 100b, and the distance between the movable apparatuses, namely the movable apparatus 100a and the different movable apparatus 100b, on the basis of the captured image data groups acquired in Step S402. Details of the processing will be described later by using FIG. 5.

In Step S405 (determination step), the traveling status determination unit 215 determines a traveling status regarding whether or not the movable apparatus 100a has to follow the different movable apparatus 100b and whether or not the movable apparatus 100a can follow the different movable apparatus 100b. In other words, in Step S405, whether or not the movable apparatus is to follow the different movable apparatus on the basis of the reliability of the position and orientation information of the movable apparatus and the analysis result in the movable apparatus analysis step.

Here, the traveling status is determined on the basis of the reliability of the movable apparatus 100a measured in Step S403 and the moving direction of the different movable apparatus 100b analyzed in Step S404. Details of the processing will be described later by using FIG. 6.

In Step S406, the traveling details determination unit 216 determines the moving direction and the moving speed of the movable apparatus 100a on the basis of the motion of the different movable apparatus 100b analyzed in Step S404 and the traveling status determined in Step S405. Details of the processing for the moving direction and the moving speed determined here will be described later by using FIG. 7.

In Step S407, end determination processing is executed. As the end determination processing, the information processing device 201 determines whether or not the movable apparatus 100a has arrived the destination set in Step S401. The destination and the coordinate position of the movable apparatus 100a are compared, and in a case where a difference from the coordinate position is equal to or less than a predetermined threshold value, it is determined that the movable apparatus 100a has arrived the destination, and a series of the processing illustrated in FIG. 4 is ended.

In a case where the difference from the coordinate position is greater than the predetermined position, the movable apparatus 100a has not arrived the destination, the processing returns to Step S402, and the series of processing is continued.

Figure 5:
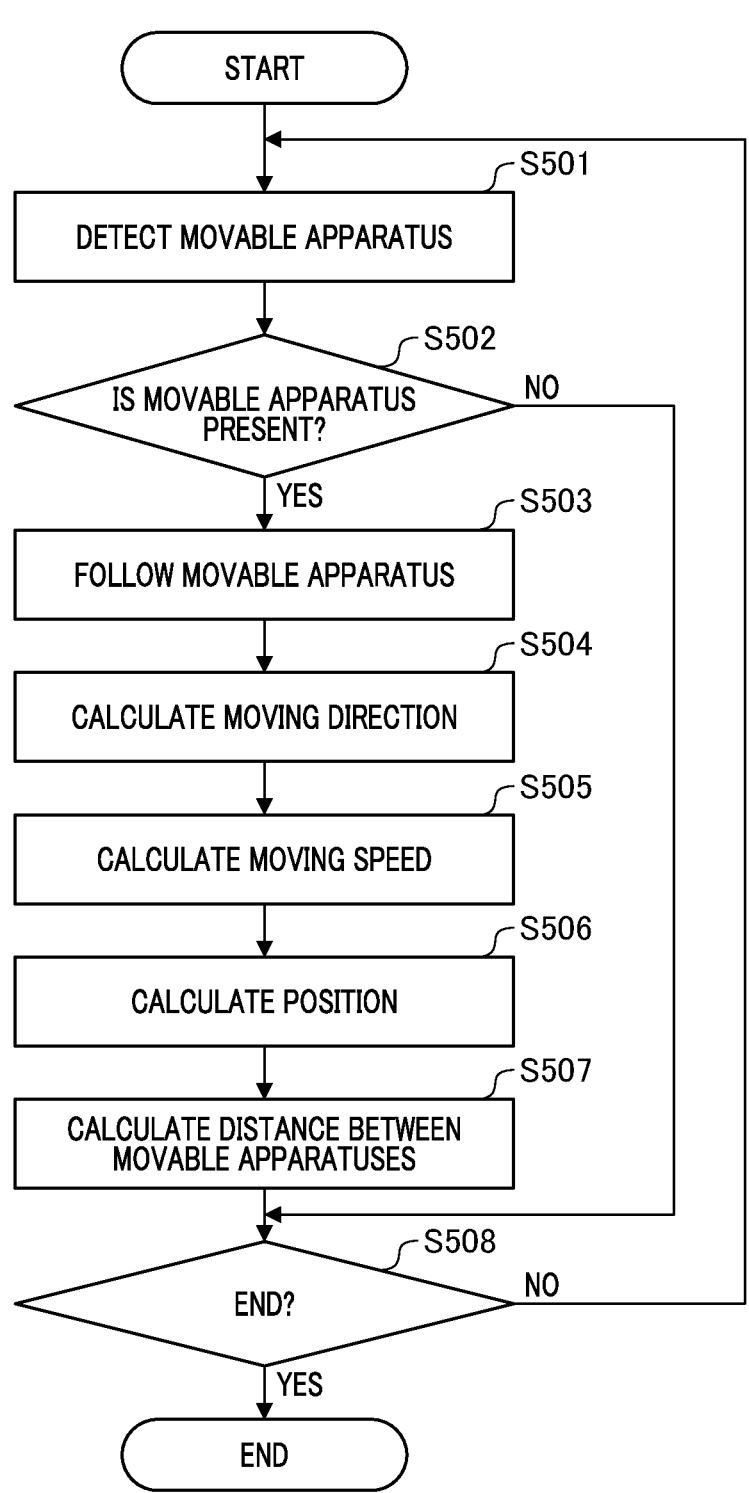
FIG. 5 is a flowchart illustrating processing in Step S404 in FIG. 4.

Next, FIG. 5 is a flowchart illustrating processing in Step S404 in FIG. 4 and explains the processing of the movable apparatus analysis unit 214 detecting the different movable apparatus 100b that is present in the surroundings of the movable apparatus 100a and analyzing motion thereof. Note that each part of the processing illustrated in the flowchart in FIG. 5 is realized by the CPU 301 as a computer executing the computer program stored in the memory.

The movable apparatus analysis unit 214 analyzes the position, the moving direction, and the moving speed of the different movable apparatus 100b, and the distance between the movable apparatus 100a and the different movable apparatus 100b as motion of the different movable apparatus 100b. Note that in the first embodiment, the position and the motion of the different movable apparatus 100b are analyzed by arranging a predetermined marker at a rear portion of the different movable apparatus 100b in advance and detecting the arranged marker.

Note that it is desirable to enable distinction regarding which of movable apparatuses the movable apparatus 100b corresponds to when the marker is read, by arranging a different maker for each different movable apparatus 100b.

In Step S501, the different movable apparatus 100b is detected. As a method for detecting the different movable apparatus 100b, the different movable apparatus 100b is detected by applying a template matching method. Specifically, predetermined marker data is read as the object model data held by the data holding unit 212 first.

The different movable apparatus 100b is detected by using the read predetermined marker data on the captured image data at the latest clock time acquired in Step S402 and applying the template matching method.

In Step S502, whether or not the different movable apparatus 100b has been detected in the surroundings of the movable apparatus 100a in Step S501 is determined. The processing proceeds to Step S503 in a case where the different movable apparatus 100b has been detected, or the processing proceeds to Step S508 in a case where the different movable apparatus has not been detected.

In Step S503, motion of the different movable apparatus 100b detected in Step S501 is tracked. Specifically, the amount of movement of the different movable apparatus 100b detected in Step S501 as a target is calculated from the continuous captured image data groups acquired in Step S402.

The coordinates of the different movable apparatus 100b as an analysis target at the latest clock time (rt) are expressed as (XWb1 (*rt*), YWb1 (*rt*). Also, the coordinates of the different movable apparatus 100b as a target at a past clock time (rt-1) by one unit time (one frame) from the latest clock time (rt) are expressed as (XWb1 (rt-1), YWb1 (rt-1)).

The amount of movement (Xvb1, Yvb1) is calculated from a difference between the coordinates (XWb1 (*rt*), YWb1 (*rt*)) and the coordinates (XWb1 (rt-1), YWb1 (rt-1)) as represented by Equations 1 and 2 below.

$$X_{vb1} = X_{Wb1(rt)} - X_{Wb1(rt-1)} \qquad \text{(Equation 1)}$$

$$Y_{vb1} = Y_{Wb1(rt)} - Y_{Wb1(rt-1)} \qquad \text{(Equation 2)}$$

The amount of movement ($X_{vb1}$, Yvb1) calculated here is referred to as a movement vector. In Step S502, the movable apparatus analysis unit 214 calculates the movement vector for the different movable apparatus 100b detected in Step S501 in this manner.

In Step S504, a value corresponding to a movement direction of the different movable apparatus 100b is calculated. The value of the movement direction is a value indicating in which direction the different movable apparatus 100b advances. Here, the movement vector calculated in Step S503 is assumed to be a value corresponding to the moving direction of the different movable apparatus 100b.

In Step S505, a moving speed of the different movable apparatus 100b is calculated. The movement vector calculated in Step S503 is divided by a difference time (a difference between the clock time (rt) and the clock time (rt-1)). In this manner, the moving speed of the different movable apparatus 100b is calculated.

In Step S506, the position of the different movable apparatus 100b is calculated. The position is a value indicating at which coordinates the different movable apparatus 100b is located in the real space. Here, the coordinates (XWb1 (*rt*), YWb1 (*rt*)) of the different movable apparatus 100b as an analysis target at the latest clock time (rt) calculated in Step S503 is output.

In Step S507, the distance between the movable apparatuses, namely the movable apparatus 100a and the different movable apparatus 100b is calculated. The coordinates of the movable apparatus 100*a* are calculated in the measurement of the position and orientation in Step S403, and the coordinates of the movable apparatus 100*a* at the latest clock time (rt) are assumed to be (XWal (rt), Ywa1 (rt)).

The distance Dab1 (rt) between the movable apparatuses is calculated as represented by Equation 3 below from a difference between the coordinates (XWal (rt), Ywa1 (rt)) of the movable apparatus 100*a* and the coordinates (XWb1 (*rt*), Ywb1 (rt)) of the different movable apparatus 100*b* obtained in Step S506.

$$D_{ab1(rt)} = \sqrt{(X_{Wb1(rt)} - X_{Wa1(rt)})^2 + (Y_{Wb1(rt)} - Y_{Wa1(rt)})^2} \quad \text{(Equation 3)}$$

In Step S508, whether or not the movable apparatus analysis processing has ended is determined. In a case where it is determined that the processing in Steps S501 to S507 has been completed on the object model data prepared in advance, the processing illustrated in FIG. 5 is ended. In a case where there is object model data that has not yet been read, the processing returns to Step S501, and the series of processing is continued.

Processing of determining a traveling status regarding whether the movable apparatus 100*a* has to follow and travel with the different movable apparatus 100*b* or has to travel autonomously is executed on the basis of the result of analyzing the motion of the different movable apparatus 100*b* obtained in the above processing and predetermined conditions.

Figure 6:
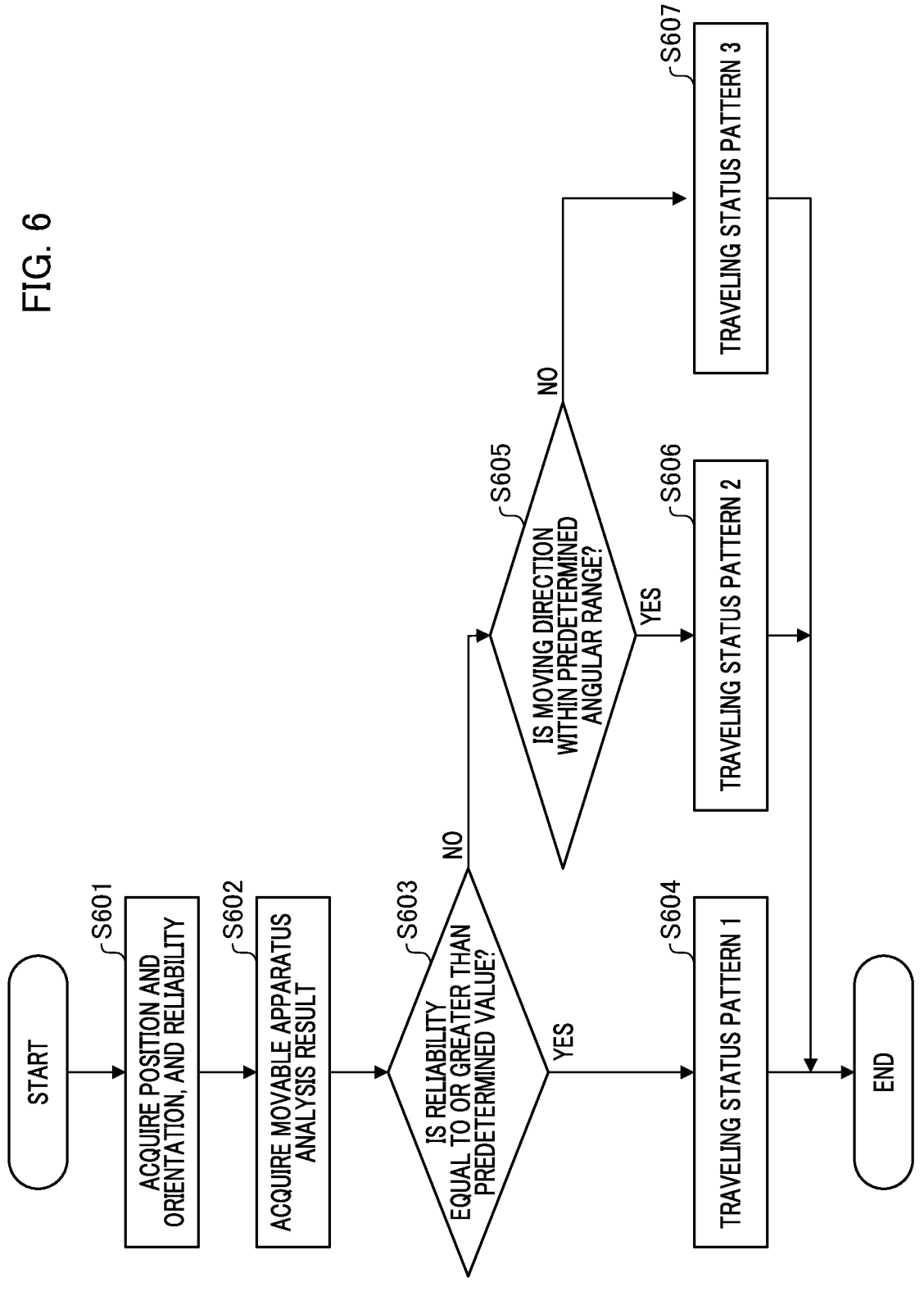
FIG. 6 is a flowchart for explaining processing performed by a traveling status determination unit 215 in Step S405 in FIG. 4.

FIG. 6 is a flowchart for explaining processing performed by the traveling status determination unit 215 in Step S405 in FIG. 4. Each piece of processing illustrated in the flowchart in FIG. 6 is realized by the CPU 301 as a computer executing the computer program stored in the memory.

In Step S601, the position and orientation and the reliability of the movable apparatus 100*a* calculated in Step S403 are acquired.

In Step S602, a result of analyzing motion of the different movable apparatus 100*b* analyzed in Step S404 is acquired.

In Step S603, whether or not the reliability of the movable apparatus 100*a* acquired in Step S601 is equal to or greater than a predetermined value is determined. The processing proceeds to Step S604 in a case where the reliability is equal to or greater than the predetermined value, or the processing proceeds to Step S605 in a case where the reliability is less than the predetermined value.

In Step S604, it is determined that stable autonomous traveling can be performed, it is determined that there is no need to perform following traveling as a result of determining the traveling status, and a traveling status pattern 1 is thus selected. In other words, in Step S604, it is determined that autonomous traveling is to be performed in a case where the reliability is equal to or greater than the threshold value.

In Step S605, whether or not the moving direction which is one of results of analyzing motion of the different movable apparatus 100*b* acquired in Step S602 is within a predetermined angular range with respect to the moving direction of the movable apparatus 100*a*. In other words, whether or not the different movable apparatus 100*b* as a target of following is within a predetermined angular range with respect to the moving direction of the movable apparatus 100*a* is examined, and whether the different movable apparatus 100*b* is moving in a similar direction is determined.

As a specific determination method, an intersecting angle cos θ is obtained by using Equation 4 below, for example, from two values of the moving direction of the movable apparatus 100*a* and the moving direction of the different movable apparatus 100*b*.

$$\cos\theta = \frac{X_{va1}X_{vb1} + Y_{va}Y_{vb1}}{\sqrt{X_{va1}^2 + Y_{va1}^2}\sqrt{X_{vb1}^2 + Y_{vb1}^2}} \quad \text{(Equation 4)}$$

Then, whether or not the obtained intersecting angle cos θ is within a predetermined value range is further determined by Equation 5, for example. The processing proceeds to Step S606 in a case where the moving direction is within the predetermined value range, or the processing proceeds to Step S607 in a case where the moving direction is outside the predetermined value range.

$$\cos\theta_{min} < \cos\theta \leq \cos\theta_{max} \quad \text{(Equation 5)}$$

In Step S606, there is a need to perform following traveling as a result of determining the traveling status, it is determined that the following traveling is to be performed, and a traveling status pattern 2 is thus selected. In other words, in a case where the reliability of the movable apparatus 100*a* is less than the predetermined value in Step S603, and it is difficult to perform stable autonomous traveling, it is determined that the different movable apparatus 100*b* moving in a similar direction is present in Step S605, and it is thereby determined that following traveling is thus to be performed.

In other words, in a case where the reliability is less than the predetermined threshold value and the moving direction of the movable apparatus and the moving direction of the different movable apparatus are within a preset range, it is determined that the movable apparatus is to follow the different movable apparatus in Step S606.

In Step S607, the different movable apparatus 100*b* that is to be regarded as a target of following is not present as a result of determining the traveling status, it is necessary to perform following traveling, but the following traveling cannot be performed, and a traveling status pattern 3 is thus selected.

In other words, reliability of the movable apparatus 100*a* is lower than the predetermined value, the different movable apparatus 100*b* as a target of following traveling in a similar direction is not present, and the following traveling cannot be performed. Therefore, since the value of the reliability of the position and orientation is low while the autonomous traveling is to be performed, a state in which the stability of the autonomous moving has been degraded is achieved.

The processing of determining traveling details of the movable apparatus 100*a* is executed in Step S406 on the basis of the traveling status determined in the processing illustrated in FIG. 6 and the result of analyzing motion of the different movable apparatus 100*b* obtained in Step S404.

Figure 7:
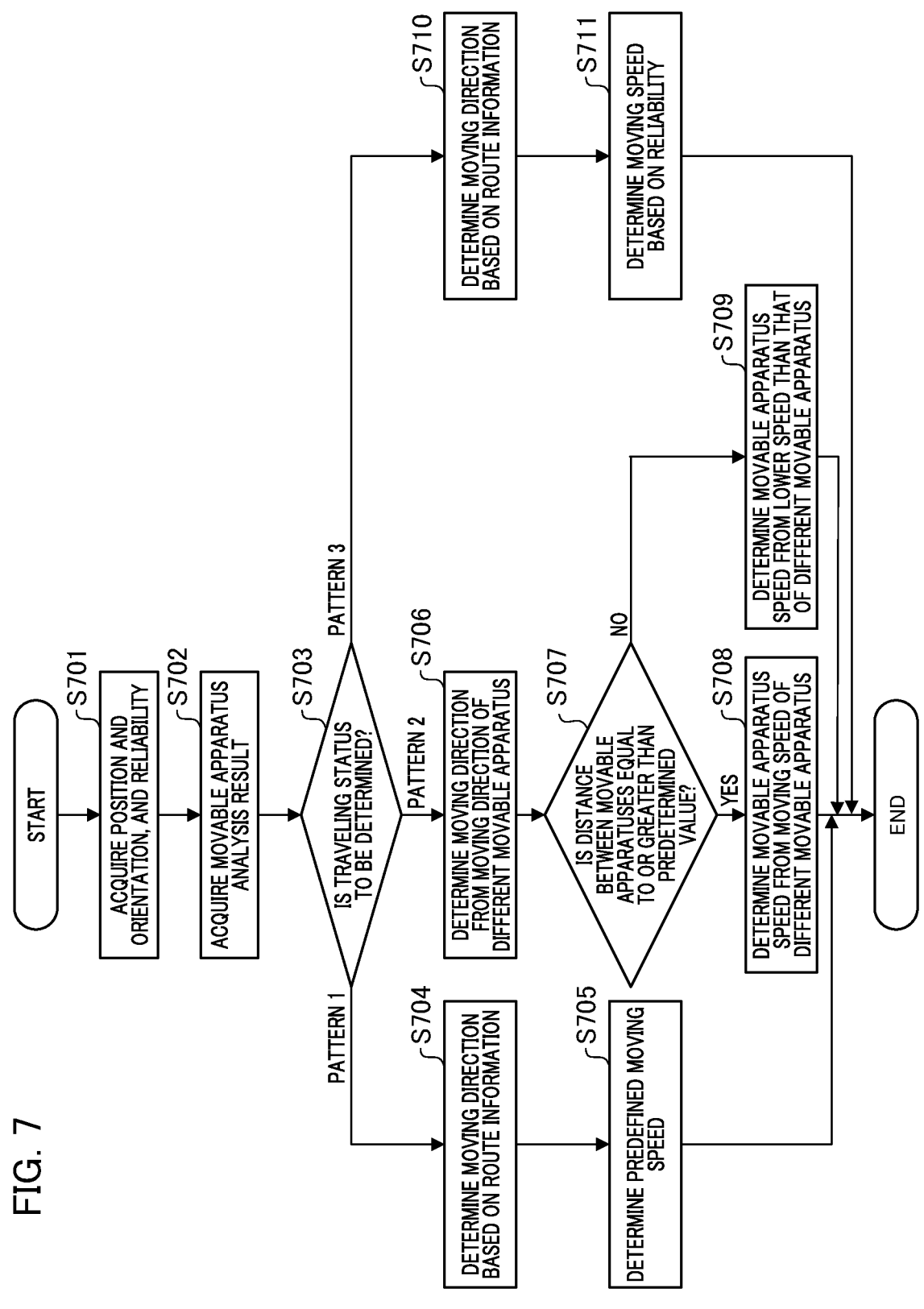
FIG. 7 is a flowchart for explaining processing performed by a traveling details determination unit 216 in Step S406 in FIG. 4.

FIG. 7 is a flowchart for explaining processing performed by the traveling details determination unit 216 in Step S406 in FIG. 4. Note that each piece of processing illustrated in the flowchart in FIG. 7 is realized by the CPU 301 as a computer executing the computer program stored in the memory. In FIG. 7, the traveling details determination unit 216 determines the moving direction and the moving speed as traveling details of the movable apparatus 100*a*.

In Step S701, the position and orientation and the reliability of the movable apparatus 100*a* calculated in Step S403 are acquired. Also, the result of analyzing motion of the different movable apparatus 100*b* analyzed in Step S404 is acquired in Step S702.

In Step S703, the traveling status pattern selected in Step S405 is acquired, and the following processing is switched on the basis of the traveling status pattern. In other words, in a case of the traveling status pattern 1 of the traveling status indicating that there is no need to perform the following traveling, the processing proceeds to Step S704.

On the other hand, the processing proceeds to Step S706 in a case of the traveling status pattern 2 of the traveling status indicating that there is a need to perform the following traveling and the following traveling is to be performed, or the processing proceeds to Step S710 in a case of the traveling status pattern 3 indicating that the following traveling cannot be performed while there is a need to perform the following traveling.

In Step S704, the moving direction is determined from the current position and orientation of the movable apparatus 100a acquired in Step S701 for the route information set in Step S401. Also, in Step S705, the moving speed is determined on the basis of the reliability of the movable apparatus 100a. Here, since the reliability is equal to or greater than the predetermined value and stable moving control can be performed, a predefined moving speed is set.

In Step S706, the moving direction of the movable apparatus 100a is determined on the basis of the position and the moving direction of the different movable apparatus 100b which are the results of analyzing motion of the different movable apparatus 100b acquired in Step S702. Specifically, a direction obtained by adding the relative direction from the movable apparatus 100a to the position of the different movable apparatus 100b and the moving direction of the different movable apparatus 100b is defined as a moving direction of the movable apparatus 100a.

A difference between the relative direction from the movable apparatus 100a to the position of the different movable apparatus 100b and the moving direction of the different movable apparatus 100b is reduced by performing following traveling in the moving direction determined here.

In Step S707, whether or not the distance between the movable apparatus 100a and the different movable apparatus 100b is equal to or greater than a predetermined value is determined. The processing proceeds to Step S708 in a case where the distance between the movable apparatuses is equal to or greater than the predetermined value, or the processing proceeds to Step S709 in a case where the distance between the movable apparatuses is less than the predetermined value.

In Step S708, the same speed as the moving speed of the different movable apparatus 100b is determined as the moving speed of the movable apparatus 100a. Here, a case where the reliability of the movable apparatus 100a is low and the distance between the movable apparatuses is equal to or greater than the predetermined value will be described. Since the distance between the movable apparatuses is equal to or greater than the predetermined value, an influence of the different movable apparatus 100b on sensor measurement is small. It is determined that a reason for degradation of the reliability of the movable apparatus 100a is not the close distance between the movable apparatuses, and the moving speed of the movable apparatus 100a is determined to be the same speed as that of the different movable apparatus 100b.

In Step S709, a lower speed than the moving speed of the different movable apparatus 100b is determined as the moving speed of the movable apparatus 100a. This is because the distance between the movable apparatus from the different movable apparatus 100b is too close, the different movable apparatus 100b significantly affects the sensor measurement, and there is a likelihood that it is not possible to sufficiently acquire information regarding the surroundings of the movable apparatus 100a.

As a result, there is a likelihood that the reliability of the movable apparatus 100a is a low value. Thus, a lower speed than the moving speed of the different movable apparatus 100b is determined as the moving speed of the movable apparatus 100a. The distance between the movable apparatuses is set to be equal to or greater than the predetermined value while following traveling is performed, and the reliability of the movable apparatus 100a is thereby improved by employing a lower speed in this manner.

In a case where the traveling status pattern 3 is determined to be employed in Step S703, the moving direction is determined from the current position and orientation of the movable apparatus 100a acquired in Step S701 for the route information set in Step S401 similarly to Step S704 in Step S710.

Furthermore, a lower speed than the predetermined moving speed is determined on the basis of the reliability of the movable apparatus 100a acquired in Step S701 in Step S711. This is because safety is to be enhanced since the reliability of the movable apparatus 100a is low and the different movable apparatus as a target of following is not present in the surroundings.

In other words, there is a high likelihood that the reliability is less than the predetermined value and it is difficult to perform stable moving control in this situation. Therefore, in a case where the reliability is less than a predetermined minimum value, for example, it is determined to temporarily stop. On the other hand, in a case where the reliability is equal to or greater than the predetermined minimum value and is less than the predetermined value, the movable apparatus is caused to perform low-speed traveling at a lower speed than the predetermined moving speed on the basis of the reliability. Alternatively, the moving speed may be gradually reduced as the reliability is lower.

As described above, the moving direction, the moving speed, and the like of the movable apparatus 100a are determined on the basis of the result of analyzing motion of the different movable apparatus 100b and the traveling status. A signal indicating the traveling details determined by the traveling details determination unit 216 is transmitted to the control device 203, and the control device 203 controls a traveling pattern when the movable apparatus 100a is moved to the destination in accordance with the signal indicating the traveling details.

As described above, according to the first embodiment, it is possible to improve moving efficiency of the movable apparatus 100a to a predetermined destination. Note that in the first embodiment, the example in which the processing is ended in response to the determination regarding whether the movable apparatus has arrived at the destination as end determination in Step S407.

However, this processing may be ended in a case where an end instruction is received from the user. Alternatively, new destination setting and route setting are preformed, and the series of processing in and after Step S402 may be continued, in a case where a route change is received from the user.

Note that although the example in which the information processing device 201 and the sensor 202 are disposed inside the movable apparatus 100 has been described in the first embodiment, the present invention is not limited thereto. For example, the information processing device 201 and the sensor 202 may be configured outside the movable apparatus 100. In the case of this configuration, the movable apparatus 100, the information processing device 201, and the sensor 202 may be connected to each other and perform data communication with each other via a network.

Also, although the motion analysis of the movable apparatus is performed by arranging a predetermined marker at the rear portion of the movable apparatus and detecting the arranged marker in the processing performed by the movable apparatus analysis unit 214 in the first embodiment, the present invention is not limited thereto.

The movable apparatus may be detected by holding a captured image group of movable apparatuses as object model data and applying the template matching method. Also, not only the template matching method but a neural network or deep learning may be applied by using the captured image group of movable apparatuses as training data as the method for detecting movable apparatuses.

Also, although the example in which the position and orientation and the reliability are obtained by comparing the feature points extracted from sensor data and the feature points of the map data when the position and orientation and the reliability are calculated by the position and orientation measurement unit 213 has been described in the first embodiment, the present invention is not limited thereto. For example, each point in the sensor data may be used as point group data, the closest points between the two point groups between the point group data of the sensor data and the point group data of the map data may be used as corresponding points, and the position and orientation may be calculated such that the sum of the distances between the points becomes small.

Specifically, the position and orientation of the movable apparatus 100*a* may be calculated by using an iterative closest point (ICP) algorithm. As for the reliability, the residual error of the corresponding point group after the registration (position matching) is calculated, and the reliability is determined to be higher as the value of the remaining is smaller.

On the other hand, the reliability is determined to be low in a case where the remaining value is a high value, and there is a high likelihood that the position and orientation have not been able to be accurately calculated similarly to the case where the feature points as described in the first embodiment are used.

Second Embodiment

In the first embodiment, motion of a different movable apparatus that is present in the surroundings of the movable apparatus is analyzed, and a traveling status regarding whether or not to follow the different movable apparatus and whether or not the following is possible is determined from the result of analyzing reliability of the host movable apparatus and the motion of the different movable apparatus. Also, the example in which the moving direction and the moving speed of the movable apparatus are determined on the basis of the result of determining the traveling status has been described.

In a second embodiment, an example in which movable apparatus information is communicated with a different movable apparatus that is present in the surroundings of a movable apparatus, a traveling status regarding whether to follow the different movable apparatus and whether the following is possible are determined on the basis of the acquired movable apparatus information, and a moving direction and a moving speed of the movable apparatus are determined will be described.

Specifically, the host movable apparatus performs communication with the different movable apparatus and acquires the movable apparatus information of the different movable apparatus. Route information of the different movable apparatus included in the acquired movable apparatus information and route information of the movable apparatus are compared to obtain a length of an overlapping route. It is determined that following traveling is to be performed in a case where the overlapping route is equal to or greater than a specific length, or it is determined that following is not needed and autonomous traveling is to be performed in a case where the overlapping length is less than the specific length.

In a case where the host movable apparatus is to follow and travel with the different movable apparatus, the moving speed of the movable apparatus is determined on the basis of reliability of the different movable apparatus and the distance between the host movable apparatus and the different movable apparatus.

Also, in a case where the reliability of the different movable apparatus is low and the distance between the movable apparatuses is short, a lower speed than the moving speed of the different movable apparatus is set as the moving speed of the host movable apparatus. In a case where the reliability of the different movable apparatus is high and the distance between the movable apparatuses is long, a higher speed than the moving speed of the different movable apparatus is set as the moving speed of the host movable apparatus.

In this manner, the traveling status is more accurately determined as compared with the first embodiment by communicating (receiving) each piece of movable apparatus information from the different movable apparatus and obtaining the overlapping route. Also, it is possible to move while keeping an appropriate distance between the movable apparatuses and to improve efficiency of moving to a destination by determining the moving speed of the movable apparatus on the basis of the reliability of the different movable apparatus and the distance between the movable apparatuses, namely between the movable apparatus and the different movable apparatus.

Note that description regarding matters similar to those in the first embodiment will be omitted and different points will be mainly described in the following description of the second embodiment.

FIG. 8 is a functional block diagram illustrating a functional configuration of an information processing device 201 according to the second embodiment. The information processing device 201 according to the second embodiment is configured of a sensor information acquisition unit 801, a data holding unit 802, a movable apparatus information communication unit 803, a position and orientation measurement unit 804, a traveling status determination unit 805, a traveling details determination unit 806, and the like.

The sensor information acquisition unit 801 receives and acquires sensor information measured by a sensor 202. The acquired sensor information is output to the position and orientation measurement unit 804. The data holding unit 802 holds map data created in advance, and the map data is used by the position and orientation measurement unit 804 to measure the position and orientation of the movable apparatus 100*a*.

The movable apparatus information communication unit 803 transmits and receives movable apparatus information to and from each other between the movable apparatus 100*a* and the different movable apparatus 100*b*. In other words, the movable apparatus information communication unit 803 acquires the movable apparatus information of the different movable apparatus in the surroundings from the different movable apparatus. The movable apparatus information includes at least one of a position and orientation, reliability, destination information, route information, a traveling method, a moving direction, a moving speed, and the like of each of the movable apparatus 100a and the different movable apparatus 100b.

The movable apparatus information received from the different movable apparatus 100b via the movable apparatus information communication unit 803 is supplied to the position and orientation measurement unit 804 and the traveling status determination unit 805. On the other hand, the movable apparatus information communication unit 803 inputs the position and orientation, the reliability, and the like of the movable apparatus 100a calculated by the position and orientation measurement unit 804. Also, the movable apparatus information communication unit 803 inputs the destination information, the route information, the traveling method, the moving direction, the moving speed, and the like from the traveling details determination unit 806.

The position and orientation measurement unit 804 calculates the position and orientation and the reliability of the movable apparatus 100a on the basis of the sensor information acquired by the sensor information acquisition unit 801 and the map data in the data holding unit 802. In other words, the position and orientation measurement unit 804 measures the position and orientation information of the movable apparatus and the reliability of the position and orientation information. Additionally, the position and orientation measurement unit 804 receives the movable apparatus information of the different movable apparatus 100b from the movable apparatus information communication unit 803 and updates the position and orientation of the movable apparatus 100a in accordance with the value of the reliability of the movable apparatus 100a.

The traveling status determination unit 805 determines a traveling status regarding whether the movable apparatus 100a has to follow the different movable apparatus 100b on the basis of the movable apparatus information of the different movable apparatus 100b received via the movable apparatus information communication unit 803. In other words, the traveling status determination unit 805 determines whether or not the movable apparatus is to follow the different movable apparatus on the basis of the movable apparatus information acquired by the movable apparatus information communication unit 803.

The traveling details determination unit 806 determines the moving direction and the moving speed as traveling details of the movable apparatus 100 on the basis of an output result of the traveling status determination unit 805. In other words, the traveling details determination unit 806 determines at least one of the moving direction and the moving speed of the movable apparatus on the basis of the result of the determination of the traveling status determination unit 805 and the movable apparatus information. The determined moving direction and the moving speed are output to the control device 203.

Figure 9:
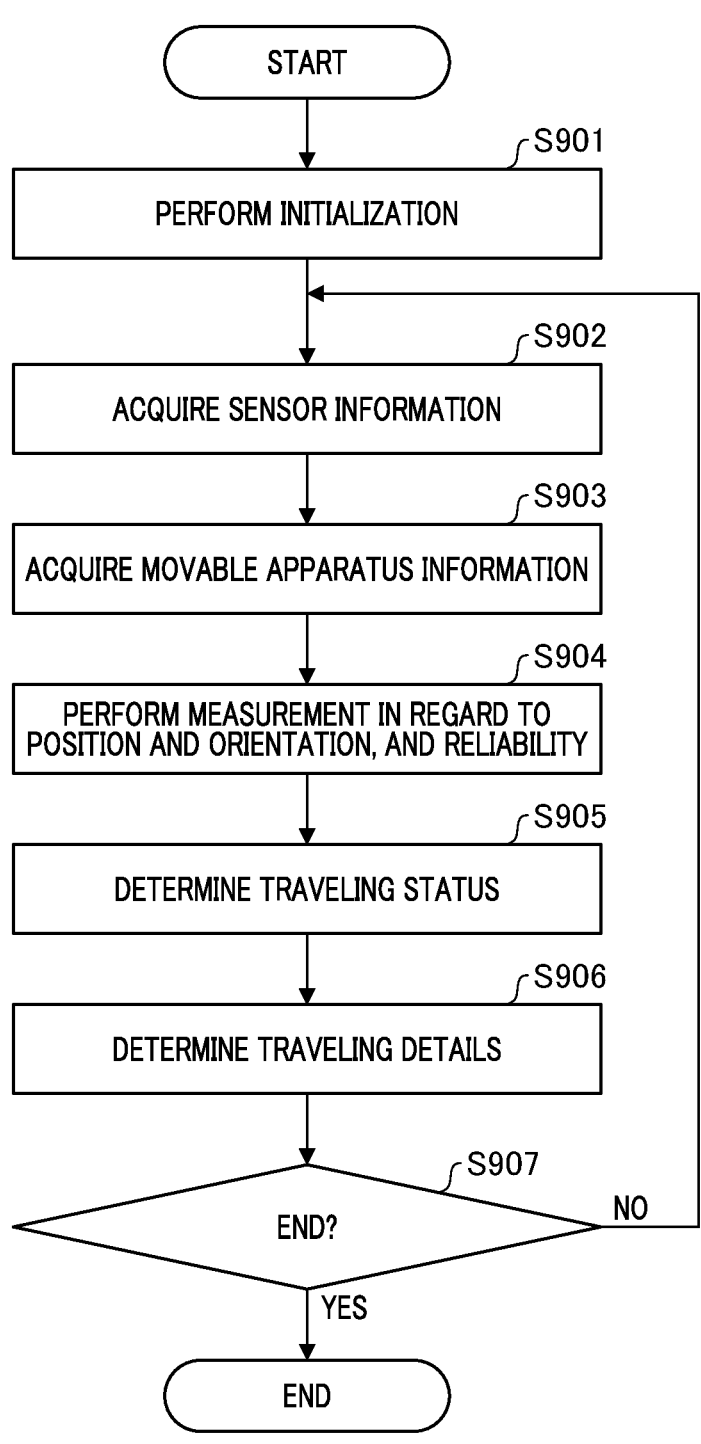
FIG. 9 is a flowchart illustrating a processing procedure of the information processing device according to the second embodiment.

FIG. 9 is a flowchart illustrating a processing procedure of the information processing device 201 according to the second embodiment. Note that each piece of processing illustrated in the flowchart in FIG. 9 is realized by a CPU 301 as a computer executing a computer program stored in a memory.

In Step S901, system initialization is performed, and the information processing device 201 is brought into an operable state similarly to the first embodiment. Also, reading of the map data held in the data holding unit 802 and destination setting and route setting of the movable apparatus 100a are performed.

In Step S902, the sensor information acquisition unit 801 acquires sensor information. Similarly to the first embodiment, the sensor information is captured image data obtained by imaging the surroundings of the movable apparatus 100a.

In Step S903 (communication step), the movable apparatus information received from the different movable apparatus 100b is acquired via the movable apparatus information communication unit 803. In other words, the movable apparatus information of the different movable apparatus in the surroundings is acquired from the different movable apparatus in Step S903.

In Step S904 (position and orientation information measurement step), the position and orientation and the reliability of the movable apparatus 100a are measured. In other words, the position and orientation information of the movable apparatus and the reliability of the position and orientation information are measured in Step S904. In the second embodiment, the movable apparatus information of the different movable apparatus 100b acquired in Step S903 is used to update the position and orientation in a case where the reliability is a low value. Details of the processing will be described later by using FIG. 10.

In Step S905 (determination step), the traveling status determination unit 805 determines a traveling status regarding whether the movable apparatus 100a has to follow and travel with the different movable apparatus 100b or has to travel autonomously. In other words, whether or not the movable apparatus is to follow the different movable apparatus is determined on the basis of the movable apparatus information acquired in the communication step in Step S905.

Here, the traveling status is determined on the basis of the movable apparatus information of the different movable apparatus 100b acquired in Step S903. Details of the processing will be described later by using FIG. 11.

In Step S906, the traveling details determination unit 806 determines the moving direction and the moving speed of the movable apparatus 100a on the basis of the results in Step S903 and Step S905. Details of the processing will be described later by using FIG. 12.

End determination processing is executed in Step S907. The end determination processing is similar to that in the first embodiment. Here, in a case where it is determined that the movable apparatus has arrived at the destination, the series of processing illustrated in FIG. 9 is ended. In a case where it is determined that the movable apparatus has not arrived at the destination, the processing returns to Step S902, and the processing is continued.

Figure 10:
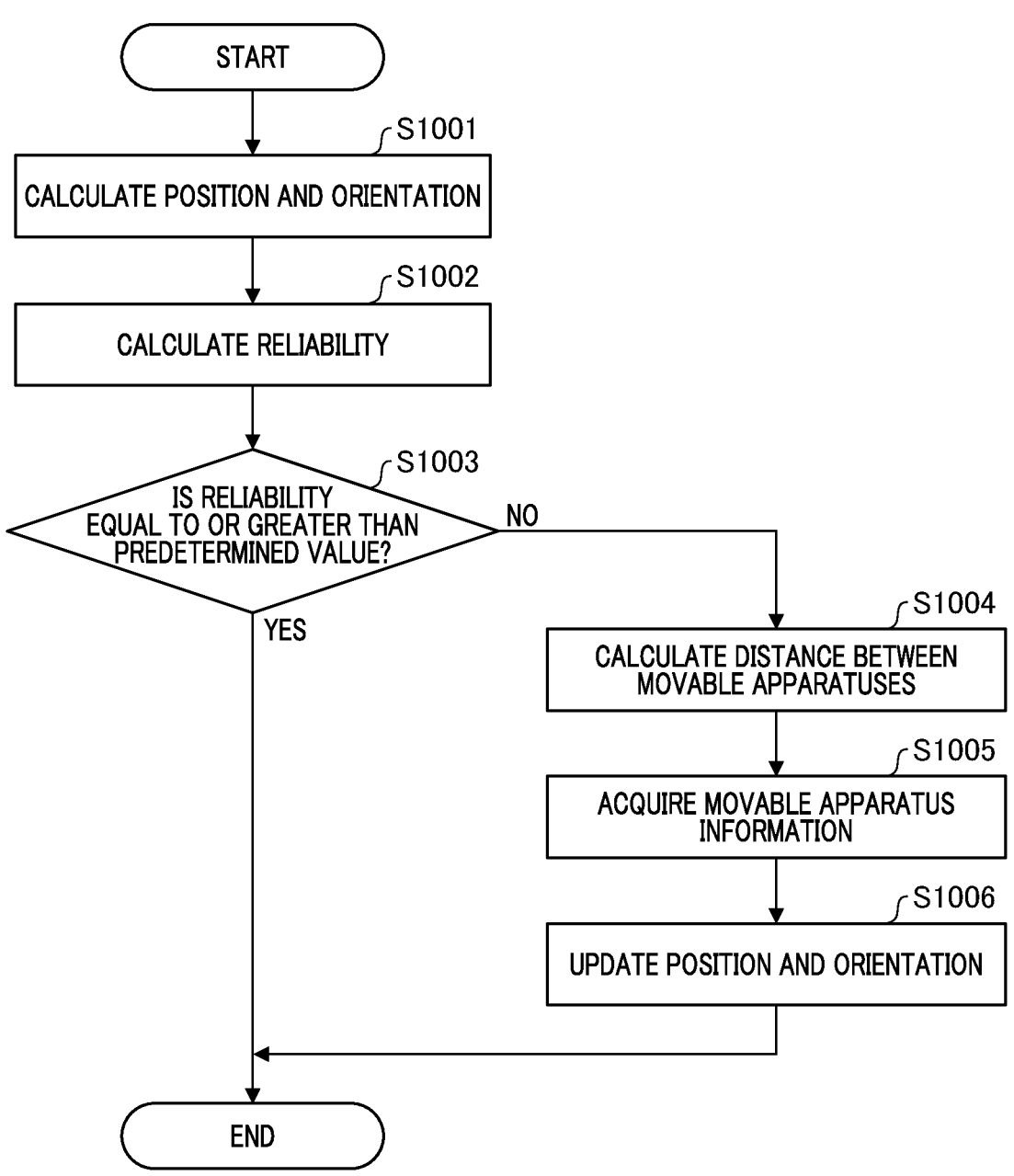
FIG. 10 is a flowchart for explaining a processing procedure in Step S904 performed by a position and orientation measurement unit 804.

FIG. 10 is a flowchart for explaining a processing example in Step S904 performed by the position and orientation measurement unit 804. Each piece of the processing illustrated in the flowchart in FIG. 10 is realized by the CPU 301 as a computer executing the computer program stored in the memory.

In Step S1001, the position and orientation of the movable apparatus 100a is calculated. In Step S1002, the reliability of the movable apparatus 100a is calculated. In Step S1003, whether or not the reliability calculated in Step S1002 is equal to or greater than a predetermined value is determined.

In a case where the reliability of the movable apparatus 100a is equal to or greater than the predetermined value, the position and orientation and the reliability calculated in Step S1001 and Step S1002 are output, and the processing in FIG.

9 is ended. In a case where the reliability of the movable apparatus 100a is less than the predetermined value, the processing proceeds to Step S1004.

In Step S1004, the distance (the distance between the movable apparatuses) between the movable apparatus 100a and the different movable apparatus 100b is calculated. Here, the relative distance to the different movable apparatus 100b is calculated from the captured image data of the surroundings of the movable apparatus 100a acquired in Step S902.

Specifically, the different movable apparatus 100b is detected from the captured image data, and the distance with respect to a detected pixel position is calculated through stereo measurement. The calculated distance Dab2 (*rt*) between the movable apparatuses is expressed as (Xab2 (*rt*), Yab2 (*rt*)).

In Step S1005, the movable apparatus information of the different movable apparatus 100b acquired in Step S903 is acquired. In Step S1006, the distance between the movable apparatuses calculated in Step S1004 and the position and orientation of the different movable apparatus 100b acquired in Step S1005 are used to update the position and orientation of the movable apparatus 100a. The position and orientation updated here and the reliability calculated in Step S1002 are output, and the processing flow in FIG. 9 is ended.

Note that the position and orientation of the movable apparatus 100a are calculated on the basis of Equations 6 and 7 below, for example. In other words, the position (Xwa2 (*rt*), Ywa2 (*rt*)) of the movable apparatus 100a is obtained from a difference between the position (Xwb2 (*rt*), Ywb2 (*rt*)) of the different movable apparatus 100b and the distance (Xab2 (*rt*), Yab2 (*rt*)) to the different movable apparatus 100b obtained in Step S1004.

$$X_{wa2(rt)} = X_{wb2(rt)} - X_{ab2(rt)} \qquad \text{(Equation 6)}$$

$$Y_{wa2(rt)} = Y_{wb2(rt)} - Y_{ab2(rt)} \qquad \text{(Equation 7)}$$

In a case where the reliability of the movable apparatus 100a is determined to be less than the predetermined value in the aforementioned processing, the position and orientation of the different movable apparatus 100b acquired through communication is used to update the position and orientation of the movable apparatus 100a. Therefore, the movable apparatus 100a can calculate the stable position and orientation of the movable apparatus 100a itself even in a case where the reliability is low.

Figure 11:
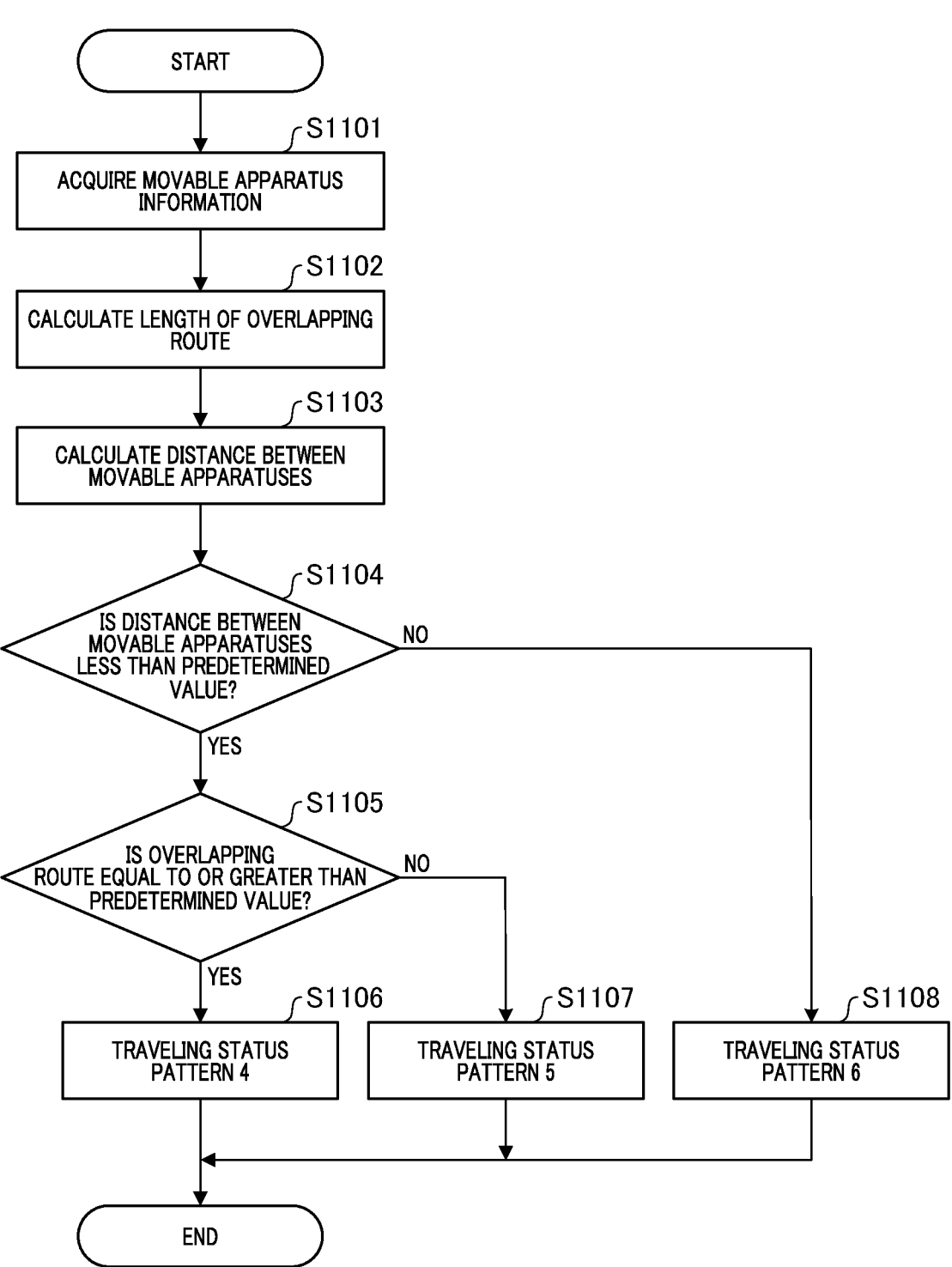
FIG. 11 is a flowchart for explaining a processing example in Step S905 performed by a traveling status determination unit 805.

FIG. 11 is a flowchart for explaining a processing example in Step S905 performed by the traveling status determination unit 805. Note that each piece of processing illustrated in the flowchart in FIG. 11 is realized by the CPU 301 as a computer executing the computer program stored in the memory.

In Step S1101, the movable apparatus information communication unit 803 acquires the movable apparatus information of the different movable apparatus 100b that is present in the surroundings of the movable apparatus 100a.

In Step S1102, the route information of the different movable apparatus 100b and the route information of the movable apparatus 100a included in the movable apparatus information acquired in Step S1101 are compared. Here, the route information is compared to obtain the length of the overlapping route.

The route information includes information regarding the destination set in Step S901, information regarding each point to be passed before the destination, and information regarding lengths between the points. In the comparison of the route information, the length of the overlapping route is calculated by comparing whether each point to be passed is the same between the movable apparatus 100a and the different movable apparatus 100b and adding the lengths between the same points.

In Step S1103, the distance between the movable apparatuses, namely the movable apparatus 100a and the different movable apparatus 100b is calculated. The same processing as that in Step S1004 is performed to calculate the distance Dab2 (*rt*) between the movable apparatuses which is the distance between the movable apparatus 100a and the different movable apparatus 100b.

In Step S1104, whether or not the distance Dab2 (*rt*) between the movable apparatuses calculated in Step S1103 is less than a predetermined value. Here, the distance between the movable apparatuses is used to evaluate whether the different movable apparatus 100b as a target of following is present within a predetermined distance range. The processing proceeds to Step S1105 in a case where the distance Dab2 (*rt*) between the movable apparatuses is less than the predetermined value, or the processing proceeds to Step S1108 in a case where the distance Dab2 (*rt*) between the movable apparatuses is equal to or greater than the predetermined value.

In Step S1105, whether or not the length of the overlapping route obtained in Step S1102 is equal to or greater than a predetermined value. Here, how long the following traveling is to be performed is evaluated on the basis of the length of the overlapping route. The processing proceeds to Step S1106 in a case where the length of the overlapping route is equal to or greater than a predetermined value, or the processing proceeds to Step S1107 in a case where the length is less than the predetermined value.

Since the different movable apparatus 100b as a target of following is present within the predetermined range, and the distance by which following traveling can be performed is equal to or greater than the predetermined value in Step S1106, it is determined that the following traveling can be performed and the following traveling is to be performed as a result of determining the traveling status, and a traveling status pattern 4 is selected.

Since the different movable apparatus 100b as a target of following is present within the predetermined range while the distance by which the following traveling can be performed is less than the predetermined value in Step S1107, it is determined that the following traveling is not needed and autonomous traveling is to be performed as a result of determining the traveling status, and a traveling status pattern 5 is selected.

Specifically, this corresponds to a case where an end point of the overlapping route has been approached, a case where the movable apparatus 100a has almost arrived at the destination, and the like. Therefore, the movable apparatus 100a selects the traveling status pattern 5 for autonomous traveling. In this manner, whether or not the movable apparatus is to follow the movable apparatus in the surroundings is determined in accordance with the length of the overlapping route between the route of the different movable apparatus and the route of the movable apparatus in Step S1105 to Step S1107.

In Step S1108, it is determined that the following traveling cannot be performed and the autonomous traveling is to be performed as a result of determining the traveling status since it is determined that the different movable apparatus 100b as a target of following is not present within the specific range in Step S1104, and a traveling status pattern 6 is selected.

The processing of determining traveling details of the movable apparatus 100a is executed in Step S906 on the basis of the traveling status pattern selected in the above processing and the movable apparatus information of the different movable apparatus 100b acquired in Step S903.

Figure 12:
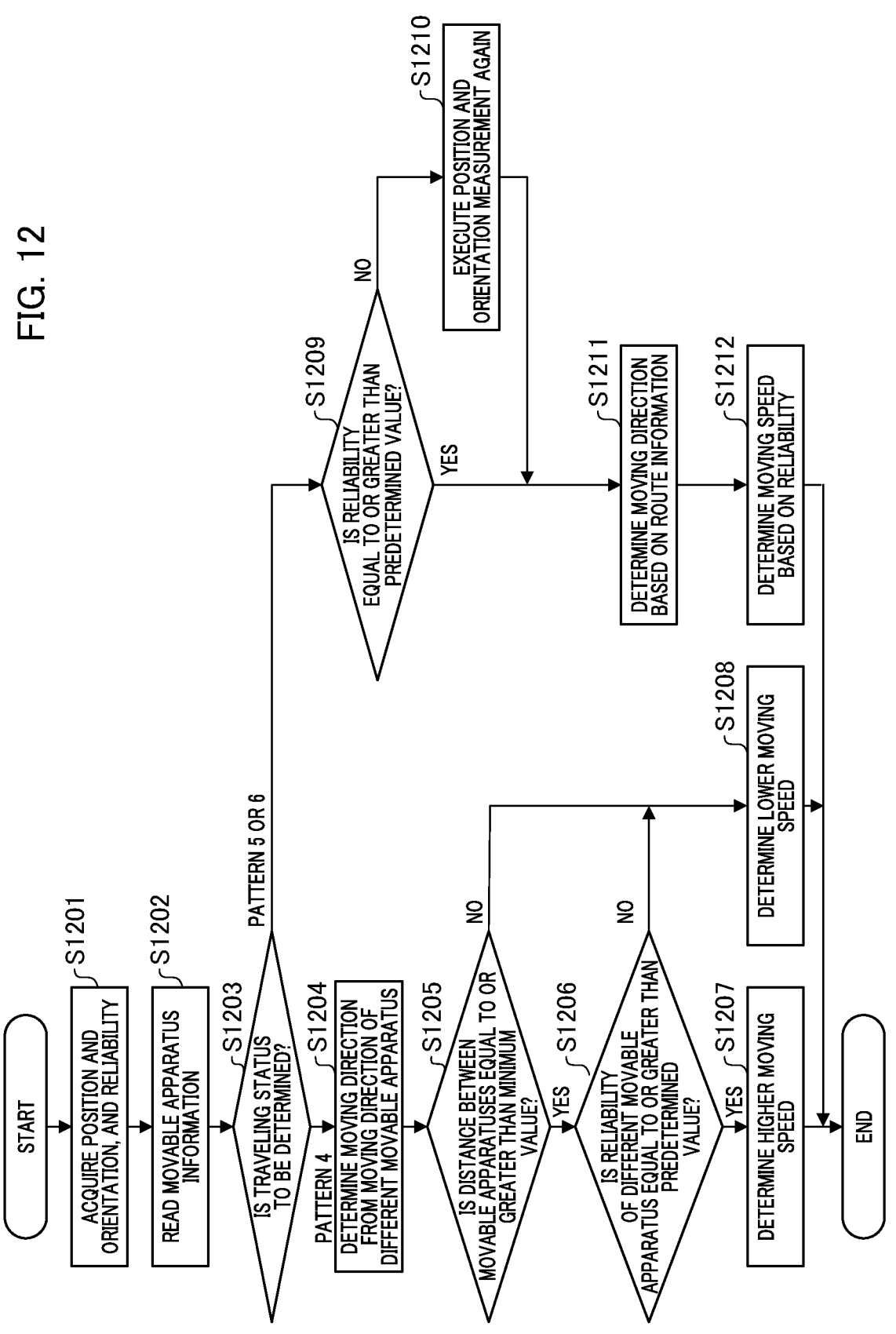
FIG. 12 is a flowchart for explaining a processing example in Step S906 performed by a traveling details determination unit 806.

FIG. 12 is a flowchart for explaining a processing example in Step S906 performed by the traveling details determination unit 806. Note that each piece of processing illustrated in the flowchart in FIG. 12 is realized by the CPU 301 as a computer executing the computer program stored in the memory.

In Step S1201, the position and orientation and the reliability of the movable apparatus 100a calculated in Step S904 are acquired. Also, in Step S1202, the movable apparatus information of the different movable apparatus 100b acquired in Step S903 is read.

In Step S1203, the traveling status pattern selected in Step S905 is acquired, and the following processing is switched on the basis of the pattern. In a case where the traveling status is the traveling status pattern 4 of performing following traveling, the processing proceeds to Step S1204.

On the other hand, in a case where the traveling status is the traveling status pattern 5 in which the following traveling is not needed and autonomous traveling is to be performed, and in a case of a result of determination of the traveling status pattern 6 in which the following traveling cannot be performed and autonomous traveling is to be performed, the processing proceeds to Step S1209.

In Step S1204, the moving direction of the movable apparatus 100a is determined from the position and the traveling direction of the different movable apparatus 100b read in Step S1202.

In Step S1205, whether or not the distance between the movable apparatuses is equal to or greater than a predetermined minimum value is determined. The processing proceeds to Step S1206 in a case where the distance between the movable apparatuses is equal to or greater than the predetermined minimum value, or the processing proceeds to Step S1208 in a case where the distance between the movable apparatuses is less than the minimum value. As the predetermined minimum value of the distance between the movable apparatuses, a target distance of the following traveling is set.

In Step S1206, whether or not the reliability of the different movable apparatus 100b is equal to or greater than a predetermined value is determined. The processing proceeds to Step S1207 in a case where the reliability of the different movable apparatus 100b is equal to or greater than the predetermined value, or the processing proceeds to Step S1208 in a case where the reliability is less than the predetermined value. The moving speed of the movable apparatus 100a is determined in Step S1207 and Step S1208 on the basis of the results of the determination in Step S1205 and Step S1206.

In Step S1207, a higher speed than the moving speed of the different movable apparatus 100b is determined as a moving speed of the movable apparatus 100a. Here, the reliability of the different movable apparatus 100b is equal to or greater than a predetermined value, and stable moving control is performed. Also, since the distance between the movable apparatuses is equal to or greater than a predefined minimum value, a higher moving speed is determined to approach the target distance between the movable apparatuses in the following traveling.

In Step S1208, a lower speed than the moving speed of the different movable apparatus 100b is determined as a moving speed of the movable apparatus 100a. Cases corresponding to Step S1208 include a case where the reliability of the different movable apparatus 100b is less than the predetermined value and a case where the distance between the movable apparatuses is less than the predetermined minimum value. In order to execute stable movement control, a lower moving speed is determined.

Here, in Step S1205 to Step S1208, the moving speed of the movable apparatus is determined in accordance with the distance between the movable apparatus and the different movable apparatus and the reliability of the different movable apparatus in a case where the movable apparatus follows the different movable apparatus. However, the moving speed of the movable apparatus may be determined in accordance with at least one of the distance between the movable apparatus and the different movable apparatus and the reliability of the different movable apparatus.

In Step S1209, whether or not the reliability of the movable apparatus 100a is equal to or greater than the predetermined value is determined. The processing proceeds to Step S1211 in a case where the reliability of the movable apparatus 100a is equal to or greater than the predetermined value, or the processing proceeds to Step S1210 in a case where the reliability is less than the predetermined value.

In Step S1210, the position and orientation measurement of the movable apparatus 100a is executed again. Here, the processing of recovering the autonomous traveling is performed by calculating the position and orientation and the reliability again. The position and orientation measurement is executed again on the basis of the position and orientation and the reliability calculated in Step S904, and the amount of calculation is thereby reduced.

In Step S1211, the moving direction is determined from the position and orientation of the movable apparatus 100a calculated in Step S904 or in Step S1210 for the route information set in Step S901.

In Step S1212, the moving speed is determined on the basis of the reliability of the movable apparatus 100a. Here, since the reliability is equal to or greater than the predetermined value and stable movement control can be performed, a predetermined moving speed is set.

As described above, the moving direction and the moving speed of the movable apparatus 100a are determined on the basis of the movable apparatus information of the different movable apparatus 100b and the traveling status determined in Step S905. A signal corresponding to the traveling status determined by the traveling details determination unit 806 is transmitted to the control device 203, and the control device 203 controls the traveling pattern when the movable apparatus 100a is moved to its destination in accordance with the signal indicating the traveling details.

As described above, according to the second embodiment, it is possible to improve efficiency of moving of the movable apparatus 100a to a predetermined destination. Moreover, the traveling status is more accurately determined as compared with the first embodiment by communicating each piece of movable apparatus information with the different movable apparatus 100b and obtaining the overlapping route.

Also, the moving speed of the movable apparatus is determined on the basis of the reliability of the different movable apparatus 100b and the distance Dab2 (rt) between the movable apparatuses, namely the movable apparatus 100a and the different movable apparatus 100b, and the moving while keeping an appropriate distance between the movable apparatuses thereby becomes possible.

Note that in the second embodiment, the traveling status is determined on the basis of whether or not the distance Dab2 (*rt*) between the movable apparatuses is less than the predetermined value and whether or not the length of the overlapping route is equal to or greater than the predetermined value in the determination processing of the traveling status determination unit 805. However, the determination of the traveling status is not limited thereto. The traveling status may be determined on the basis only of the determination of the distance between the movable apparatuses, or the traveling status may be determined on the basis only of the determination of the length of the overlapping route.

Also, the moving speed is determined from the result of determining whether or not the distance Dab2 (*rt*) between the movable apparatuses is equal to or greater than the minimum value and whether or not the reliability of the different movable apparatus 100*b* is equal to or greater than the predetermined value as a method of the traveling details determination unit 806 determining the moving speed in a case of performing following traveling in the second embodiment.

However, the method of determining the moving speed in the case of performing the following traveling is not limited thereto. For example, the moving speed may be determined on the basis only of the determination of the distance between the movable apparatuses, or the moving speed may be determined on the basis only of the determination of the reliability of the different movable apparatus 100*b*.

Third Embodiment

In the first embodiment and the second embodiment, the example in which traveling status regarding whether to follow and travel with the different movable apparatus is determined from the result of analyzing motion of the different movable apparatus that is present in the surroundings of the movable apparatus or the movable apparatus information acquired through communication and the moving direction and the moving speed of the movable apparatus are determined has been described. In the third embodiment, an example in which the movable apparatus information of the movable apparatus and the different movable apparatus that is present in the surroundings of the movable apparatus is visualized will be described.

Figure 13:
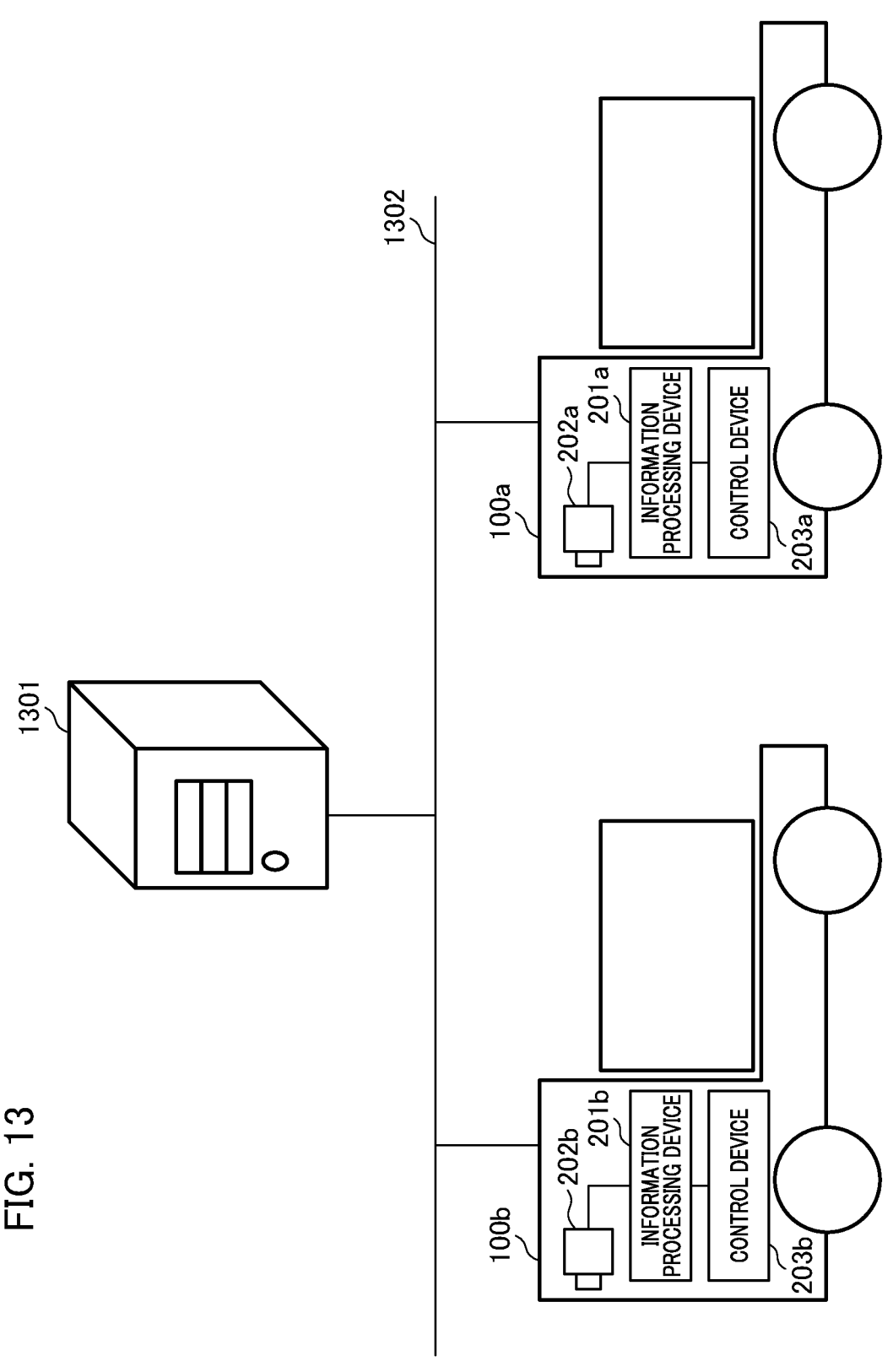
FIG. 13 is a schematic diagram illustrating a configuration example of a movable apparatus control system including a management server and a movable apparatus according to a third embodiment.

FIG. 13 is a schematic diagram illustrating a configuration example of a movable apparatus control system including a management server and movable apparatuses according to the third embodiment. As illustrated in FIG. 13, the movable apparatus control system according to the third embodiment is configured of a movable apparatus 100*a*, a different movable apparatus 100*b*, a management server 1301, a network 1302, and the like.

The movable apparatus 100*a* is configured of an information processing device 201*a*, a sensor 202*a*, a control device 203*a*, and the like, and these may have the same configurations as those of the information processing device 201, the sensor 202, and the control device 203 in the first embodiment and the second embodiment, respectively.

The management server 1301 is connected to each of the movable apparatuses 100*a* and 100*b* via the network 1302. In the drawing, the network 1302 is wired connection such as the Ethernet (registered trademark) or wireless connection such as a wireless LAN.

Figure 14:
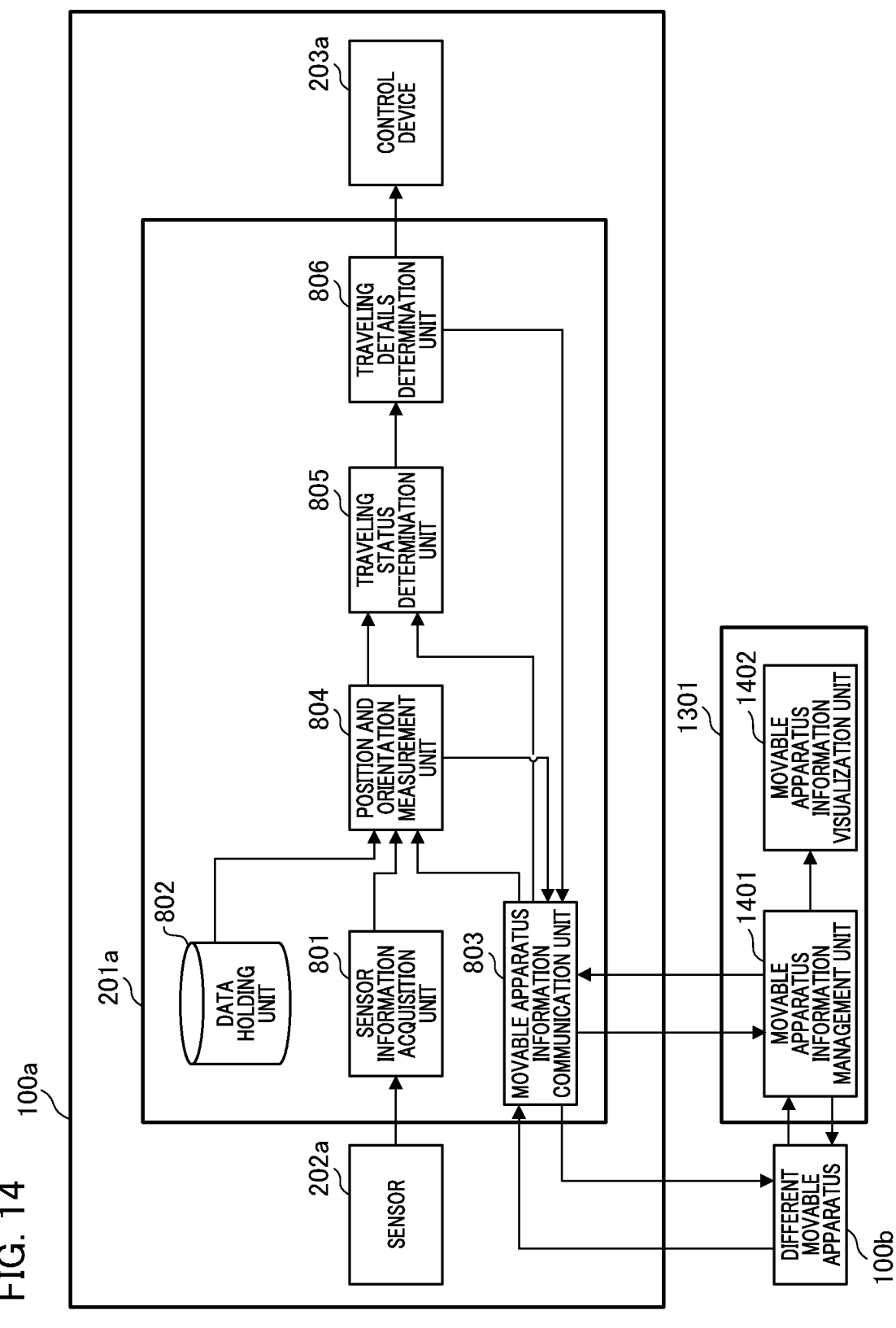
FIG. 14 is a functional block diagram illustrating a functional configuration of the movable apparatus control system according to the third embodiment.

FIG. 14 is a functional block diagram illustrating a functional configuration of the movable apparatus control system according to the third embodiment. The movable apparatus control system in FIG. 14 has a configuration obtained by adding the management server 1301 to the functional configuration in FIG. 8 described above in the second embodiment.

The management server 1301 has a movable apparatus information management unit 1401 and a movable apparatus information visualization unit 1402. Note that some or all of the functional blocks in FIG. 14 may be implemented by software or may be implemented by using hardware as described above.

The movable apparatus information management unit 1401 receives movable apparatus information of each movable apparatus from the movable apparatus information communication unit 803 of each of the movable apparatuses 100*a*, 100*b*, 100*c*, and the like. Then, the movable apparatus information management unit 1401 summarizes and manages the received movable apparatus information. The movable apparatus information visualization unit 1402 analyzes, processes, and visualizes data to visualize the movable apparatus information of each movable apparatus summarized by the movable apparatus information management unit 1401 and displays the data as a UI screen.

Figure 15A:
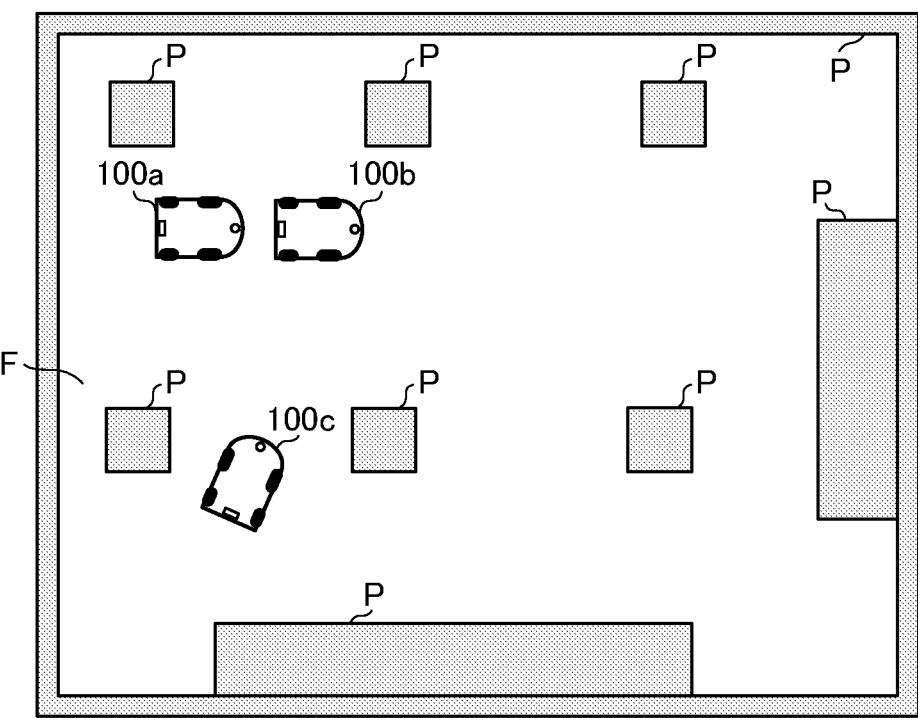
FIGS. 15A and 15B are diagrams illustrating an example of a UI screen output by a movable apparatus information visualization unit 1402 according to the third embodiment.
Figure 15B:
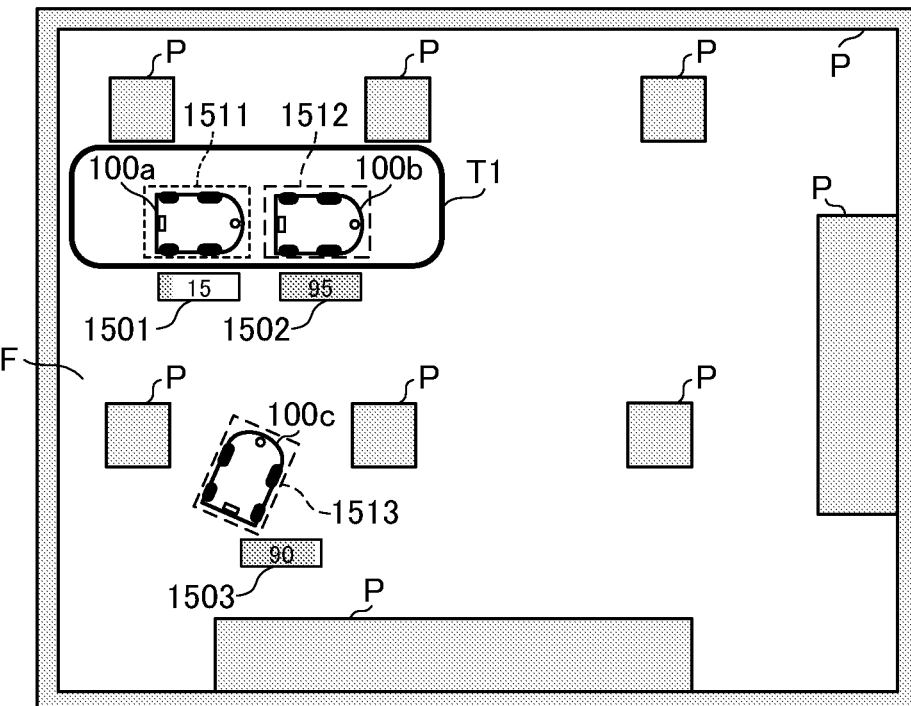

FIGS. 15A and 15B are diagrams illustrating an example of the UI screen output by the movable apparatus information visualization unit 1402 according to the third embodiment. The user interface (UI) screen illustrated in FIG. 15A illustrates a schematic view in which map elements of map data held in the data holding unit 802 is projected to a plane corresponding to a floor surface.

In FIGS. 15A and 15B, the floor surface F along which the movable apparatus 100 moves and P denoting walls and poles are illustrated. Also, the positions/postures of the movable apparatus 100*a*, the movable apparatus 100*b*, and the movable apparatus 100*c* are acquired from each piece of movable apparatus information summarized by the movable apparatus information management unit 1401, and the movable apparatuses 100*a*, 100*b*, and 100*c* are displayed in a superimposed manner.

On the UI screen output by the movable apparatus information visualization unit 1402, at least one of a position and orientation, reliability, destination information, route information, a traveling method, a moving direction, and a moving speed of each movable apparatus is displayed in a superimposed manner as the movable apparatus information of each movable apparatus summarized by the movable apparatus information management unit 1401.

FIG. 15B displays, in a superimposed manner, reliability of each movable apparatus as a data bar in addition to the position and orientation of the movable apparatus displayed in FIG. 15A. 1501 denotes a value of the reliability of the movable apparatus 100*a*, 1502 denotes a value of the reliability of the movable apparatus 100*b*, and 1503 denotes a value of the reliability of the movable apparatus 100*c*.

Here, the calculated reliability is normalized to a value from 0 to 100. Also, a short bar is displayed in a case where the numerical value is a small value, and a long bar is displayed in a case where the numerical value is a large value, in FIG. 15B.

Also, the traveling method of each movable apparatus is displayed in a superimposed manner by using dashed lines and a dotted line in FIG. 15B. The dashed lines 1512 and 1513 display that autonomous traveling is being performed, and the dotted line 1511 displays that following traveling is being performed. Moreover, the line T1 surrounding the movable apparatus 100*a* and the movable apparatus 100*b* indicates the movable apparatus that is performing following traveling and the movable apparatus as a target of following as a group.

In this manner, since the movable apparatus information of each movable apparatus is summarized by the management server and is visualized and displayed, it is possible to easily recognize the traveling status of each movable apparatus in the third embodiment.

Note that an example in which the present invention is applied to an autonomous movable apparatus has been described in the above embodiments. However, the movable apparatus in the above embodiments is not limited to an autonomous movable apparatus such as an automated guided vehicle (AGV) or an autonomous mobile robot (AMR). Also, the movable apparatus may be one that does not move completely autonomously but is used like a drive assistant.

Also, the movable apparatus may be any moving apparatus that moves, such as an automobile, a train, a ship, an airplane, a robot, or a drone, for example. Also, a part of the information processing device in the embodiments may be mounted in such a movable apparatus or may not be mounted therein. Moreover, it is also possible to apply the present invention to a case where the movable apparatus is remotely controlled.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing device through a network or various storage media. Then, a computer (or a CPU, an MPU, or the like) of the information processing device may be configured to read and execute the program. In such a case, the program and the storage medium storing the program configure the present invention.

For example, the present invention includes implementation achieved by using at least one processor or circuit configured to function of the embodiments explained above. Note that a plurality of processors may be used and caused to perform distributed processing.

This application claims the benefit of Japanese Patent Application No. 2022-176088, filed on Nov. 2, 2022, which is hereby incorporated by reference herein in its entirety.

What is claimed is:

1. An information processing device including at least one processor or circuit configured to function as:
   a sensor information acquisition unit configured to acquire information regarding surroundings of a movable apparatus;
   a position and orientation information measurement unit configured to perform measurement in regard to position and orientation information of the movable apparatus and a reliability of the position and orientation information;
   a movable apparatus analysis unit configured to analyze motion of a different movable apparatus in the surroundings from the information regarding the surroundings of the movable apparatus acquired by the sensor information acquisition unit;
   a determination unit configured to determine whether or not the movable apparatus is to follow the different movable apparatus on the basis of the reliability of the position and orientation information of the movable apparatus and a result of the analysis of the movable apparatus analysis unit; and the processor controls a moving direction of the movable apparatus based a determination result by the determination unit,
   wherein, the movable apparatus performs autonomous traveling toward a predetermined destination based on the determination result by the determination unit in a case where the reliability of the position and orientation information is equal to or greater than a predetermined threshold value, and
   wherein the movable apparatus follows the different movable apparatus based on the determination result by the determination unit in a case where the reliability of the position and orientation information is less than the predetermined threshold value and the moving direction of the movable apparatus and a moving direction of the different movable apparatus are within a preset range.

2. The information processing device according to claim 1, wherein the at least one processor or circuit is further configured to function as: a traveling details determination unit configured to determine at least one of the moving direction and a moving speed of the movable apparatus on the basis of a result of the determination of the determination unit and the result of the analysis of the movable apparatus analysis unit.

3. The information processing device according to claim 1, wherein the movable apparatus analysis unit analyzes at least one of a position, the moving direction, and a moving speed of the different movable apparatus and a distance between the movable apparatus and the different movable apparatus.

4. A movable apparatus, comprising at least one processor or circuit configured to function as: a control device that controls the movable apparatus in accordance with a result of the determination of the traveling details determination unit of the information processing device according to claim 2, wherein the control device controls at least one of the moving direction and the moving speed of the movable apparatus in accordance with a result of the determination of the traveling details determination unit.

5. The information processing device according to claim 1, wherein the position and orientation information measurement unit is configured to perform measurement in regard to the reliability of the position and orientation information by comparing the information regarding surroundings of the movable apparatus acquired by the sensor information acquisition unit and a predetermined map data.

6. An information processing device comprising at least one processor or circuit configured to function as:
   a sensor information acquisition unit configured to acquire information regarding surroundings of a movable apparatus;
   a communication unit configured to acquire movable apparatus information regarding a different movable apparatus in the surroundings from the different movable apparatus;
   a position and orientation information measurement unit configured to perform measurement in regard to position and orientation information of the movable apparatus and a reliability of the position and orientation information;
   a determination unit configured to determine whether or not the movable apparatus is to follow the different movable apparatus on the basis of the movable apparatus information acquired by the communication unit; and the processor controls a moving direction of the movable apparatus based a determination result by the determination unit, wherein, the movable apparatus performs autonomous traveling toward a predetermined destination based on the determination result by the determination unit in a case where the reliability of the position and orientation information is equal to or greater than a predetermined threshold value, and wherein the movable apparatus follows the different movable apparatus based on the determination result by the determination unit in a case where the reliability of the position and orientation information is less than the predetermined threshold value and the moving direction of the movable apparatus and a moving direction of the different movable apparatus are within a preset range.

7. The information processing device according to claim 6, wherein the at least one processor or circuit is further configured to function as: a traveling details determination unit configured to determine at least one of the moving direction and a moving speed of the movable apparatus on the basis of a result of the determination of the determination unit and the movable apparatus information.

8. The information processing device according to claim 6, wherein the movable apparatus information includes at least one of position and orientation information, reliability of the position and orientation information, destination information, route information, a moving speed, and the moving direction of the different movable apparatus.

9. The information processing device according to claim 6, wherein the determination unit determines whether or not the movable apparatus is to follow the different movable apparatus in the surroundings in accordance with a length of an overlapping route between a route of the different movable apparatus and a route of the movable apparatus.

10. The information processing device according to claim 6, wherein the at least one processor or circuit is further configured to function as: a traveling details determination unit configured to determine a moving speed of the movable apparatus in accordance with at least one of a distance between the movable apparatus and the different movable apparatus and a reliability of position and orientation information of the different movable apparatus in a case where the movable apparatus follows the different movable apparatus.

11. An information processing method comprising:

acquiring information regarding surroundings of a movable apparatus;

performing measurement in regard to position and orientation information of the movable apparatus and a reliability of the position and orientation information;

analyzing motion of a different movable apparatus in the surroundings from the information regarding the surroundings of the movable apparatus acquired in the acquiring of the information regarding the surroundings;

determining whether or not the movable apparatus is to follow the different movable apparatus on the basis of the reliability of the position and orientation information of the movable apparatus and a result of the analysis in the analyzing of the motion; and controlling a moving direction of the movable apparatus based a determination result by the determining, wherein, the movable apparatus performs autonomous traveling toward a predetermined destination based on the determination result by the determining in a case where the reliability of the position and orientation information is equal to or greater than a predetermined threshold value, and wherein the movable apparatus follows the different movable apparatus based on the determination result by the determining in a case where the reliability of the position and orientation information is less than the predetermined threshold value and the moving direction of the movable apparatus and a moving direction of the different movable apparatus are within a preset range.

12. An information processing method comprising:

acquiring information regarding surroundings of a movable apparatus;

acquiring movable apparatus information regarding a different movable apparatus in the surroundings from the different movable apparatus;

performing measurement in regard to position and orientation information of the movable apparatus and a reliability of the position and orientation information;

determining whether or not the movable apparatus is to follow the different movable apparatus on the basis of the movable apparatus information acquired in the acquiring of the movable apparatus information; and controlling a moving direction of the movable apparatus based a determination result by the determining, wherein, the movable apparatus performs autonomous traveling toward a predetermined destination based on the determination result by the determining in a case where the reliability of the position and orientation information is equal to or greater than a predetermined threshold value, and wherein the movable apparatus follows the different movable apparatus based on the determination result by the determining in a case where the reliability of the position and orientation information is less than the predetermined threshold value and the moving direction of the movable apparatus and a moving direction of the different movable apparatus are within a preset range.

13. A non-transitory computer-readable storage medium storing a computer program including instructions for executing following processes:

sensor information acquiring of acquiring information regarding surroundings of a movable apparatus;

position and orientation information measuring of performing measurement in regard to position and orientation information of the movable apparatus and a reliability of the position and orientation information;

movable apparatus analyzing of analyzing motion of a different movable apparatus in the surroundings from the information regarding the surroundings of the movable apparatus acquired in the sensor information acquiring;

determining whether or not the movable apparatus is to follow the different movable apparatus on the basis of the reliability of the position and orientation information of the movable apparatus and a result of the analysis in the movable apparatus analyzing; and controlling a moving direction of the movable apparatus based a determination result by the determining, wherein, the movable apparatus performs autonomous traveling toward a predetermined destination based on the determination result by the determining in a case where the reliability of the position and orientation information is equal to or greater than a predetermined threshold value, and wherein the movable apparatus follows the different movable apparatus based on the determination result by the determining in a case where the reliability of the position and orientation information is less than the predetermined threshold value and the moving direction of the movable apparatus and a moving direction of the different movable apparatus are within a preset range.

14. A non-transitory computer-readable storage medium storing a computer program including instructions for executing following processes:

sensor information acquiring of acquiring information regarding surroundings of a movable apparatus;

communicating of acquiring movable apparatus information of a different movable apparatus in the surroundings from the different movable apparatus;

position and orientation information measuring of performing measurement in regard to posture position information of the movable apparatus and a reliability of the position and orientation information;

determining whether or not the movable apparatus is to follow the different movable apparatus on the basis of the movable apparatus information acquired in the communicating; and controlling a moving direction of the movable apparatus based a determination result by the determining, wherein, the movable apparatus performs autonomous traveling toward a predetermined destination based on the determination result by the determining in a case where the reliability of the position and orientation information is equal to or greater than a predetermined threshold value, and wherein the movable apparatus follows the different movable apparatus based on the determination result by the determining in a case where the reliability of the position and orientation information is less than the predetermined threshold value and the moving direction of the movable apparatus and a moving direction of the different movable apparatus are within a preset range.

\* \* \* \* \*